United States Patent
Yamamoto et al.

(10) Patent No.: US 7,873,474 B2
(45) Date of Patent: Jan. 18, 2011

(54) DRIVING ASSIST SYSTEM FOR VEHICLE

(75) Inventors: Masashi Yamamoto, Hiroshima (JP); Youhei Iwashita, Hiroshima (JP); Tomokazu Okugi, Hiroshima (JP)

(73) Assignee: Mazda Motor Corporation (JP)

( * ) Notice: Subject to any disclaimer, the term of this patent is extended or adjusted under 35 U.S.C. 154(b) by 871 days.

(21) Appl. No.: 11/798,670

(22) Filed: May 16, 2007

(65) Prior Publication Data

US 2007/0282532 A1 Dec. 6, 2007

(30) Foreign Application Priority Data

| May 30, 2006 | (JP) | ............................. 2006-150361 |
| Sep. 5, 2006 | (JP) | ............................. 2006-240760 |

(51) Int. Cl.
*G08G 1/00* (2006.01)

(52) U.S. Cl. ...................... 701/301; 340/901; 340/902; 340/905

(58) Field of Classification Search ................ 701/301, 701/96; 340/902, 901, 905, 907, 904, 909, 340/916, 426.16; *G08G 1/00*
See application file for complete search history.

(56) References Cited

U.S. PATENT DOCUMENTS

| 5,661,650 | A | 8/1997 | Sekine et al. | |
| 6,326,903 | B1* | 12/2001 | Gross et al. | ................. 340/988 |
| 6,614,362 | B2* | 9/2003 | Siegel | ........................ 340/902 |
| 6,788,964 | B1 | 9/2004 | Satomura et al. | |
| 6,823,241 | B2* | 11/2004 | Shirato et al. | .................. 701/1 |
| 7,099,776 | B2* | 8/2006 | King et al. | .................. 701/213 |
| 7,355,525 | B2* | 4/2008 | Tengler et al. | ............. 340/905 |
| 7,362,239 | B2* | 4/2008 | Franczyk et al. | ........... 340/936 |
| 2002/0198660 | A1* | 12/2002 | Lutter et al. | ................. 701/301 |
| 2003/0025597 | A1* | 2/2003 | Schofield | .................... 340/435 |
| 2003/0225511 | A1 | 12/2003 | Kushida et al. | |
| 2004/0138809 | A1 | 7/2004 | Mukaiyama | |
| 2004/0155795 | A1* | 8/2004 | Quintana | .................... 340/902 |
| 2004/0174977 | A1 | 9/2004 | Kanemitsu | |
| 2005/0168350 | A1* | 8/2005 | Tauchi | ........................ 340/903 |
| 2006/0139619 | A1* | 6/2006 | Fujii et al. | ................. 356/4.03 |

FOREIGN PATENT DOCUMENTS

| JP | 4290200 | | 10/1992 |
| JP | 06249876 | A * | 9/1994 |
| JP | 2004-145479 | | 5/2004 |
| JP | 2004-185429 | | 7/2004 |
| JP | 2004185429 | | 7/2004 |
| JP | 2006033480 | A * | 2/2006 |

OTHER PUBLICATIONS

European Search Report Application EP 07 009 343 dated Aug. 3, 2007.

* cited by examiner

*Primary Examiner*—Tuan C To
(74) *Attorney, Agent, or Firm*—Studebaker & Brackett PC; Donald R. Studebaker

(57) ABSTRACT

A mapping block locates the own vehicle and another vehicle on a map DB. Another-vehicle intersection detecting block detects intersections located on a traveling path of another vehicle. An own-vehicle intersection detecting block detects intersections located in front of the own vehicle. A collision-intersection identifying block identifies an intersection that is identical to each other as the possible collision intersection by comparing the intersections detected. An information providing block conducts information provision based on calculations of an arriving time of another vehicle by using a distance to the possible collision intersection and a vehicle speed. Accordingly, the collision possibility with another vehicle can be accurately determined.

23 Claims, 13 Drawing Sheets

FIG. 5
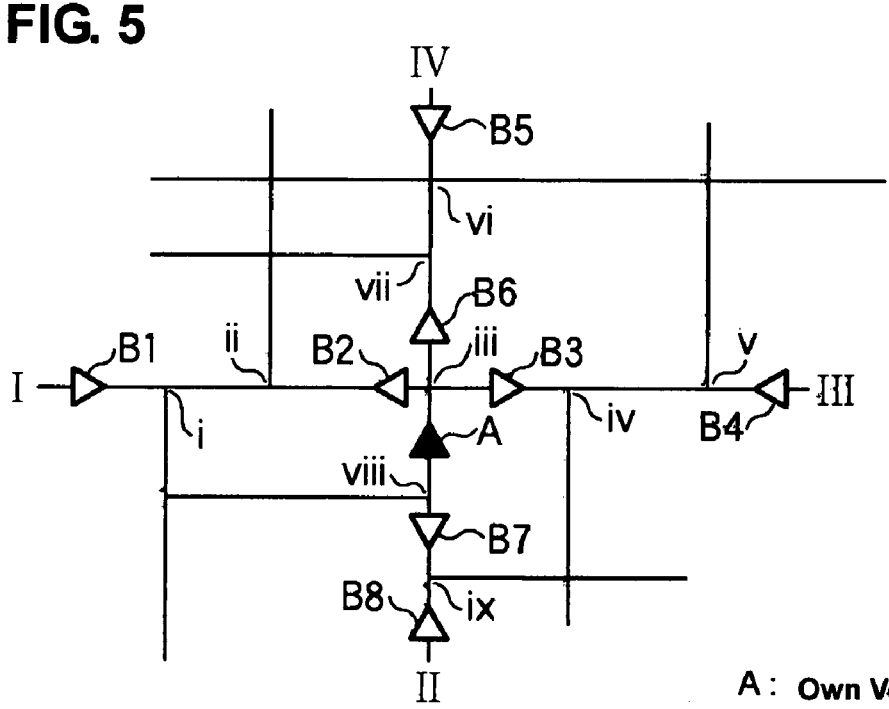
A : Own Vehicle
B1~B8 : Another Vehicle (ID)
i~ix : Intersection
I~IV : Road (ID)
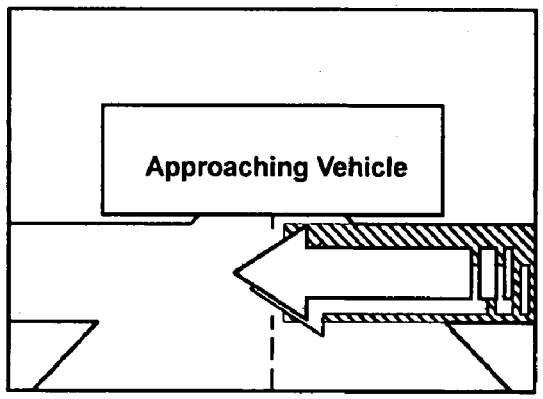
FIG. 6A
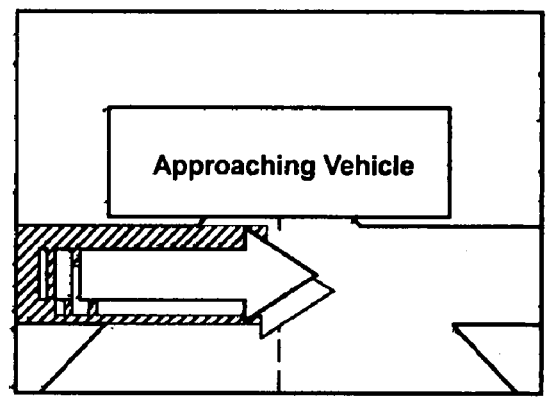
FIG. 6B

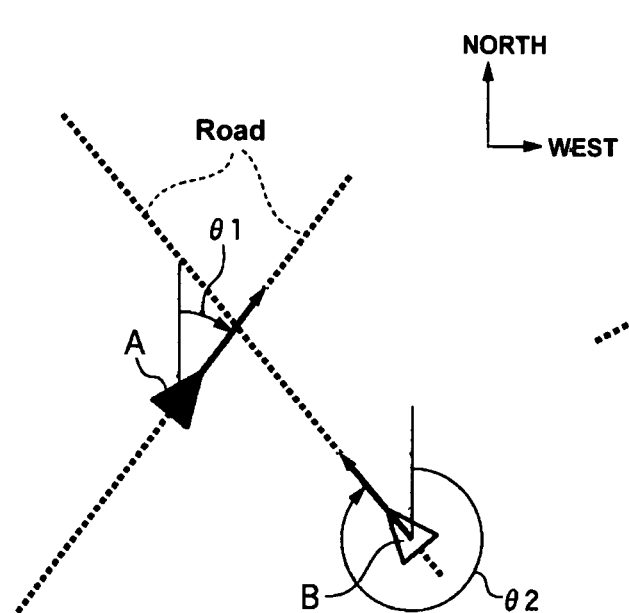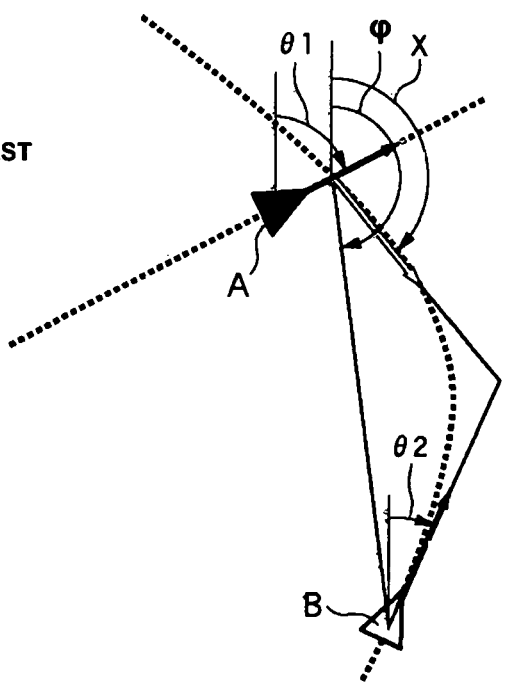
FIG. 7A  FIG. 7B
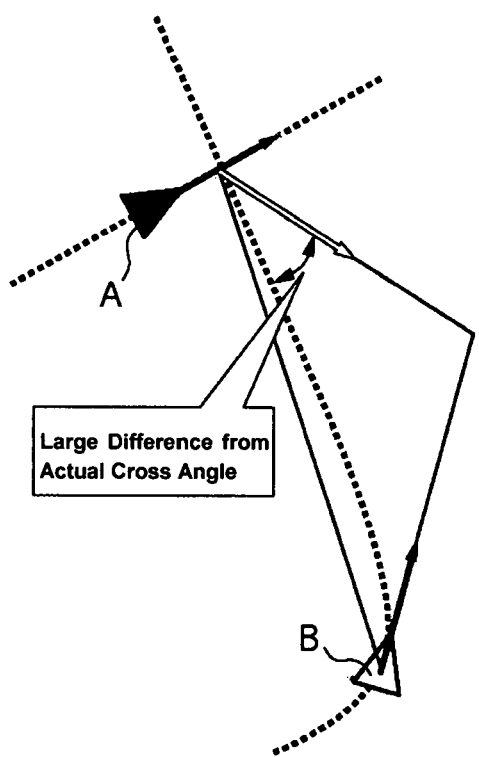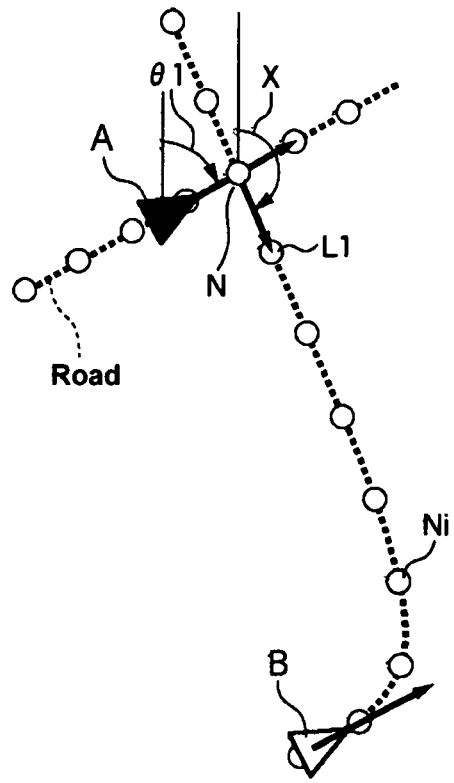
FIG. 8A  FIG. 8B

FIG. 13

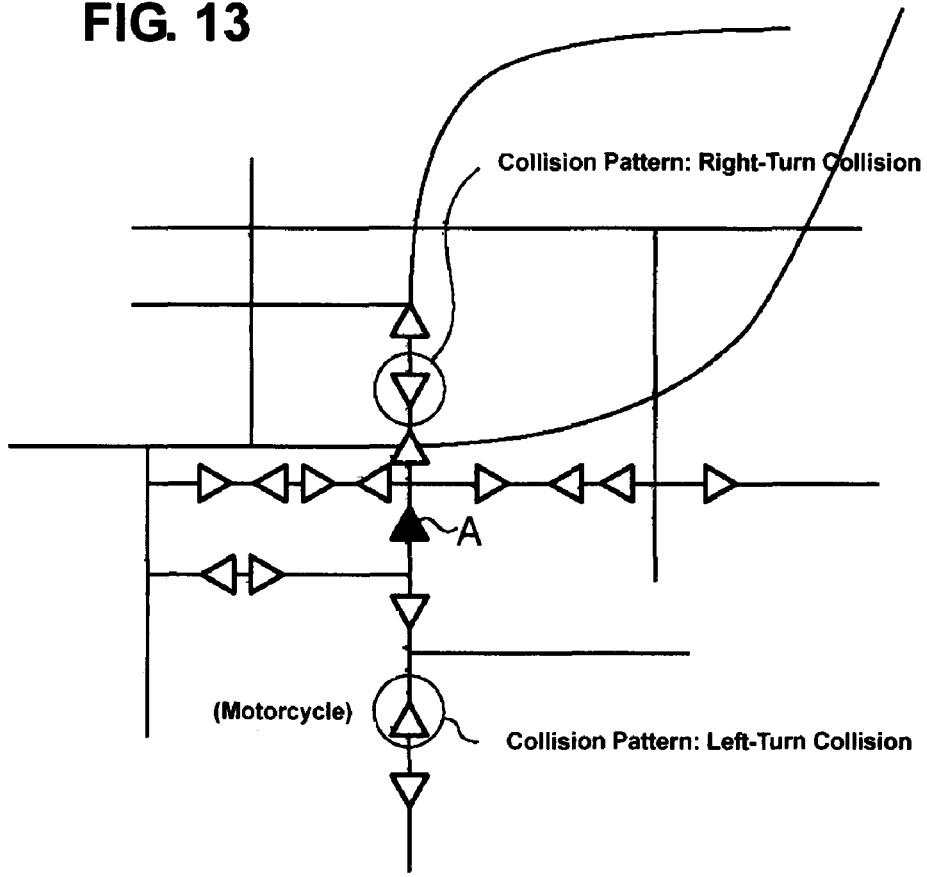

FIG. 14

| Collision Pattern | Another Vehicle |
|---|---|
| Right-Turn Collision | Vehicle approaching Intersection from Front |
| Sudden-Meeting Collision | Vehicle approaching Intersection from Right or Left |
| Left-Turn Collision | Motorcycle approaching to Intersection from behind on Left |
| Head-On Collision | Vehicle approaching from Front |
| Rear-End Collision | Vehicle stopping in the same Lane in front of Own Vehicle |
| Collision at Traffic-Lane Change | Vehicle approaching from behind |

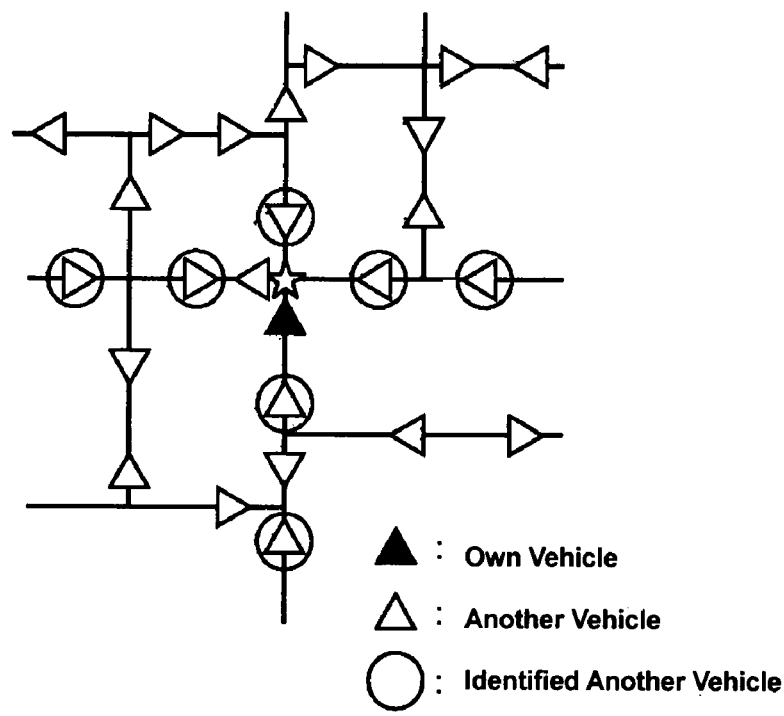
FIG. 17
▲ : Own Vehicle
△ : Another Vehicle
◯ : Identified Another Vehicle
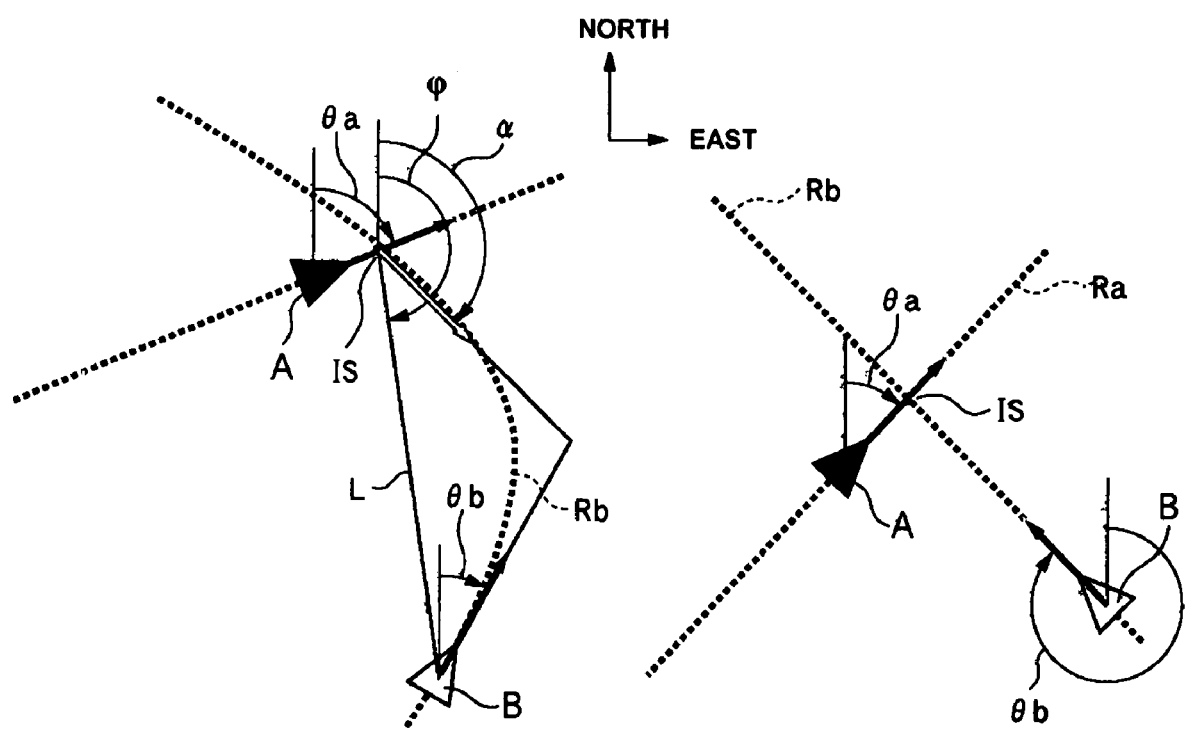
FIG. 18A  FIG. 18B

B1~B8 : Another Vehicle
(i)~(x) : Intersections

DRIVING ASSIST SYSTEM FOR VEHICLE

BACKGROUND OF THE INVENTION

The present invention relates to a driving assist system to conduct information provision by using information of an own vehicle and information obtained from another vehicle via an inter-vehicle transmission.

Japanese Patent Laid-Open Publication No. 2004-185429 discloses a technology in which intersection coordinates transmitted from another vehicle via the inter-vehicle transmission and the coordinates of an intersection in front of the own vehicle are compared, and thereby it is determined whether another vehicle is approaching the same intersection.

The above-described technology aims at providing accurate detection of the location of another vehicle by using the inter-vehicle transmission, without any improper influence of inaccurate detection of the vehicle location. Further, information on distance from the intersection is also transmitted, thereby the detection accuracy of relative location with respect to the intersection is further improved.

According to the above-described technology, however, the intersection coordinates transmitted refer to a map data base that another vehicle posses. Accordingly, in a case where the own vehicle possess its map data base that is different from that of another vehicle in design way (method), locating another vehicle may become inaccurate, so accurate prediction of collision between the own vehicle and another vehicle could not be provided. Namely, there is a problem in that mapping accuracy of another vehicle on the map date of the own vehicle would deteriorate, so proper collision warning or the like could not be provided.

A similar technology is also disclosed in Japanese Patent Laid-Open Publication No. 2004-145479. This technology may not solve the above-described problem properly either.

SUMMARY OF THE INVENTION

The present invention has been devised in view of the above-described problem, and an object of the present invention is to provide a driving assist system that can accurately locate another vehicle on the map data of the own vehicle, thereby the collision possibility with another vehicle can be accurately determined.

According to the present invention, there is provided a driving assist system for a vehicle, comprising a map data memory device to memorize map data, an inter-vehicle communication device to transmit and receive information between an own vehicle and another vehicle, a mapping device to locate another vehicle on the map data that the own vehicle has in the map memory device, location of another vehicle being identified based on information with respect to another vehicle that is obtained by the inter-vehicle communication device, an another-vehicle intersection detecting device to detect an intersection that is located on a traveling path of another vehicle, the traveling path of another vehicle being predicted based on the information with respect to another vehicle that is obtained by the inter-vehicle communication device, an own-vehicle intersection detecting device to detect an intersection that is located in front of the own vehicle, a collision-intersection identifying device to identify an intersection that is identical to each other as a possible collision intersection by comparing the intersections detected by the another-vehicle intersection detecting device and the own-vehicle intersection detecting device, and an information providing device to conduct an information provision based on calculation of an arriving time of another vehicle to reach the possible collision intersection identified by the collision-intersection identifying device.

According to the above-described driving assist system for a vehicle, another vehicle can be located on the map data of the own vehicle accurately, so determination of a possible collision between the own vehicle and another vehicle can be made accurately.

According to an embodiment of the present invention, the information providing device conducts a warning of an existence of another vehicle that is likely to collide with the own vehicle. Thereby, the warning of possible collision can be properly provided to a passenger (driver) of the own vehicle.

According to another embodiment of the present invention, the information providing device is configured to change a manner of the information provision in a traveling-road situation where locating another vehicle on the map data of the mapping device is inaccurate. Thereby, any delay or wrong information provision due to an error of the collision determination can be prevented.

According to another embodiment of the present invention, the collision-intersection identifying device is configured to calculate a cross angle of the traveling path of another vehicle with respect to the possible collision intersection by using an equilateral triangle in a case where the traveling path of another vehicle is a road with a curve. Thereby, the cross angle of the traveling path of another vehicle with respect to the possible collision intersection can be calculated accurately, so proper information provision can be achieved. For example, when some information provision related to a situation where a collision occurs upon meeting suddenly (hereinafter, referred to as "sudden-meeting collision") is required, any improper information provision for predicting vehicle's making a turn to a specified side that is opposite to a vehicle-traveling-lane side may be prevented (herein, "making a turn to a specified side that is opposite to a vehicle-traveling-lane side" means, for example, "making a turn to the right" in a country (or region) where vehicles are supposed to travel on a left-side lane, such as Japan.)

According to another embodiment of the present invention, the collision-intersection identifying device is configured to calculate a cross angle of the traveling path of another vehicle with respect to the possible collision intersection by using an intersection node among intersection nodes of the traveling path of another vehicle that is right before the possible collision intersection in a case where the traveling path of another vehicle is a road with a curve. Thereby, the cross angle of the traveling path of another vehicle with respect to the possible collision intersection can be calculated accurately even when another vehicle travels on the road with curve, for example.

According to another embodiment of the present invention, the mapping device is configured such that another vehicle located thereby is limited to the one that exists within a specified distance from the own vehicle. Further, according to another embodiment of the present invention, the mapping device is configured such that another vehicle located thereby is limited in a maximum number thereof to be located for each traveling path. According to these embodiments, a burden of calculation processing in a case where plural vehicles are located on the map data of the own vehicle may be reduced.

According to another embodiment of the present invention, the driving assist system further comprises a collision pattern predicting device to predict a collision pattern between the own vehicle and another vehicle at the possible collision intersection, and the mapping device is configured such that another vehicle located thereby is limited to the one that has the collision pattern predicted by the collision predicting device. Further, according to another embodiment of the present invention, the collision pattern predicting device is configured to predict a rear-end collision or a collision at a traffic-lane change as the collision pattern when the own vehicle travels on an expressway, and the mapping device is configured such that another vehicle located thereby is the one that exits in front of or behind the own vehicle. Further, according to another embodiment of the present invention, the collision pattern predicting device is configured to predict a collision of the own vehicle making a turn or making a straight drive as the collision pattern when the own vehicle travels around the possible collision intersection, and the mapping device is configured such that another vehicle located thereby is the one that exists within a specified distance from the own vehicle. Further, according to another embodiment of the present invention, the collision pattern predicting device is configured to predict a rear-end collision or a collision at a traffic-lane change as the collision pattern when the own vehicle travels on a normal road that has two or more traffic-lanes on one side and no intersection, and the mapping device is configured such that another vehicle located thereby is the one that exits in front of or behind the own vehicle. Further, according to another embodiment of the present invention, the collision pattern predicting device is configured to predict a rear-end collision or a head-on collision as the collision pattern when the own vehicle travels on a normal road that has one traffic-lane on one side and no intersection, and the mapping device is configured such that another vehicle located thereby is the one that exits in front of the own vehicle. According to these embodiments, based on traveling situations of the own vehicle, not only another vehicle that is likely to collide with the own vehicle can be identified, but pattern of collision with another vehicle can be predicted. As a result, a prediction accuracy of possible collision can be improved.

According to another embodiment of the present invention, the mapping device is configured such that other plural vehicles located thereby are categorized as a group of vehicles that travel on a congested road when the other plural vehicles travel at a specified speed or lower within a specified distance from the own vehicle. Thereby, a burden of calculation processing in a case where plural vehicles are located on the map data of the own vehicle any be reduced.

According to another embodiment of the present invention, the mapping device is configured such that another vehicle located thereby is the one that is picked up with priority as a vehicle having a specified feature based on the information with respect to another vehicle that is obtained by the inter-vehicle communication device. Thereby, the vehicle having a higher possibility of collision is picked up and thereby determination as to the possible collision can be made promptly.

According to another embodiment of the present invention, the mapping device is configured such that another vehicle located thereby is the one that exists in front of the own vehicle and stops, slows down, or travels at a speed that exceeds a specified relative speed with respect to the own vehicle. Thereby, the vehicle having a higher possibility of collision is picked up and thereby determination as to the possible collision can be made promptly.

According to another embodiment of the present invention, the mapping device is configured such that another vehicle located thereby is excluded from the one that exists behind the own vehicle and travels slower than the own vehicle does. Thereby, an unnecessary calculation processing for another vehicle having no possibility of collision may be avoided.

According to another embodiment of the present invention, the driving assist system further comprising an intersection information calculating device to calculate road information of the possible collision intersection, and an information provision timing controlling device to change timing of the information provision with respect to another vehicle by the information providing device based on the road information calculated by the intersection information calculating device. Thereby, another vehicle driving in even an unclear (blind) intersection can be identified promptly, so safety can be improved.

According to another embodiment of the present invention, the road information is a road connection angle between a traveling path of the own vehicle and the traveling path of another vehicle at the possible collision intersection, and the information provision timing controlling device is configured such that the timing of the information provision by the information providing device is advanced in a case where the road connection angle is an accurate angle. Thereby, another vehicle driving in the unclear (blind) intersection, in which the road connection angle is the accurate angle, can be identified promptly, so the safety can be improved.

According to another embodiment of the present invention, the road connection angle is obtained from information of a traveling speed and a traveling direction of the own vehicle that is provided by a navigation system. Thereby, the calculation processing of the road connection angle may be simplified.

According to another embodiment of the present invention, the road connection angle is obtained from respective locations of the own vehicle, another vehicle, and the possible collision intersection. Thereby, an erroneous calculation of the road connection angle due to differences between traveling directions and intersection approaching angles of the own vehicle and another vehicle can be prevented.

According to another embodiment of the present invention, the information provision timing controlling device is configured such that the timing of the information provision by the information providing device is advanced in a case where the traveling path of another vehicle leading to the possible collision intersection has a curve, which is determined based on a location of the own vehicle, a traveling direction of the own vehicle, a location of the possible collision intersection, and a traveling direction of another vehicle. Thereby, the traveling path condition of another vehicle can be accurately detected, so the erroneous calculation of the road connection angle due to the differences between traveling directions and intersection approaching angles of the own vehicle and another vehicle can be prevented properly.

According to another embodiment of the present invention, the information provision timing controlling device is configured such that the timing of the information provision by the information providing device is advanced in a case where the own vehicle makes a straight drive or makes a turn to a specified side that is opposite to a vehicle-traveling-lane side at the possible collision intersection. Herein, as described above, "making a turn to a specified side that is opposite to a vehicle-traveling-lane side" means, for example, "making a turn to the right" in a country (or region) where vehicles are supposed to travel on a left-side lane, such as Japan. Thereby, for example, in a case where the own vehicle will stay in the intersection for a relatively long period compared to the own vehicle making a turn to the left in Japan, another vehicle driving in the intersection can be identified promptly, so that the collision can be prevented properly even in a dangerous situation where the own vehicle makes the straight drive or makes the right turn.

According to another embodiment of the present invention, the timing advance of the information provision by the information providing device in the case where the own vehicle makes the straight drive or makes the turn is conducted for the information provision with respect to another vehicle that approaches from a vehicle-traveling-lane side of the own vehicle. Herein, likewise, "a vehicle-traveling-lane side of the own vehicle" means "a left side of the own vehicle" in a country (or region) where vehicles are supposed to travel on a left-side lane, such as Japan. Thereby, the collision with another vehicle approaches from the vehicle-traveling-lane side of the own vehicle can be also prevented properly in addition to the above-described dangerous situation case.

According to another embodiment of the present invention, the traveling path of another vehicle is configured to be predicted from navigation information of a navigation system that is on another vehicle. Thereby, another vehicle that has the navigation information showing making the right turn or the left turn just before the possible collision intersection can be properly eliminated, so the accuracy of identifying another vehicle can be improved.

Other features, aspects, and advantages of the present invention will become apparent from the following description which refers to the accompanying drawings.

BRIEF DESCRIPTION OF THE DRAWINGS

FIG. 5 is an explanatory diagram showing the identification process of the vehicle having the collision possibility of FIG. 4.

FIGS. 6A and 6B are samples of images of information provision displayed on a screen.

FIGS. 7A and 7B are comparative diagrams showing a calculation method of an intersection approaching direction in step S29 of FIG. 4; FIG. 7A shows a calculation method 1 and FIG. 7B shows a conventional method.

FIGS. 8A and 8B are comparative diagrams showing a calculation method of an intersection approaching direction in step S29 of FIG. 4; FIG. 8A shows a calculation method 2 and FIG. 8B shows a conventional method.

FIG. 13 is an explanatory diagram showing the identification process of the vehicle having the collision possibility of FIG. 12.

FIG. 14 is a chart showing an exemplified collision pattern that is predicted when the vehicle having the collision possibility is identified.

FIG. 17 is an explanatory diagram of a calculation method of a cross angle at a intersection (road connection angle) in step S330 of FIG. 16.

FIGS. 18A and 18B are explanatory diagrams of the calculation method of the cross angle at the intersection (road connection angle) in the step S330 of FIG. 16.

DETAILED DESCRIPTION OF THE INVENTION

Hereinafter, preferred embodiments of the present invention will be described referring to the accompanying drawings. It should be understood that even though embodiments are separately described, single features thereof may be combined to additional embodiments.

Herein, the embodiments described below just show examples to materialize the present invention, and any modifications and improvements of these embodiments may be applied within the scope of a sprit of the present invention.

[System Structure]

Figure 1:
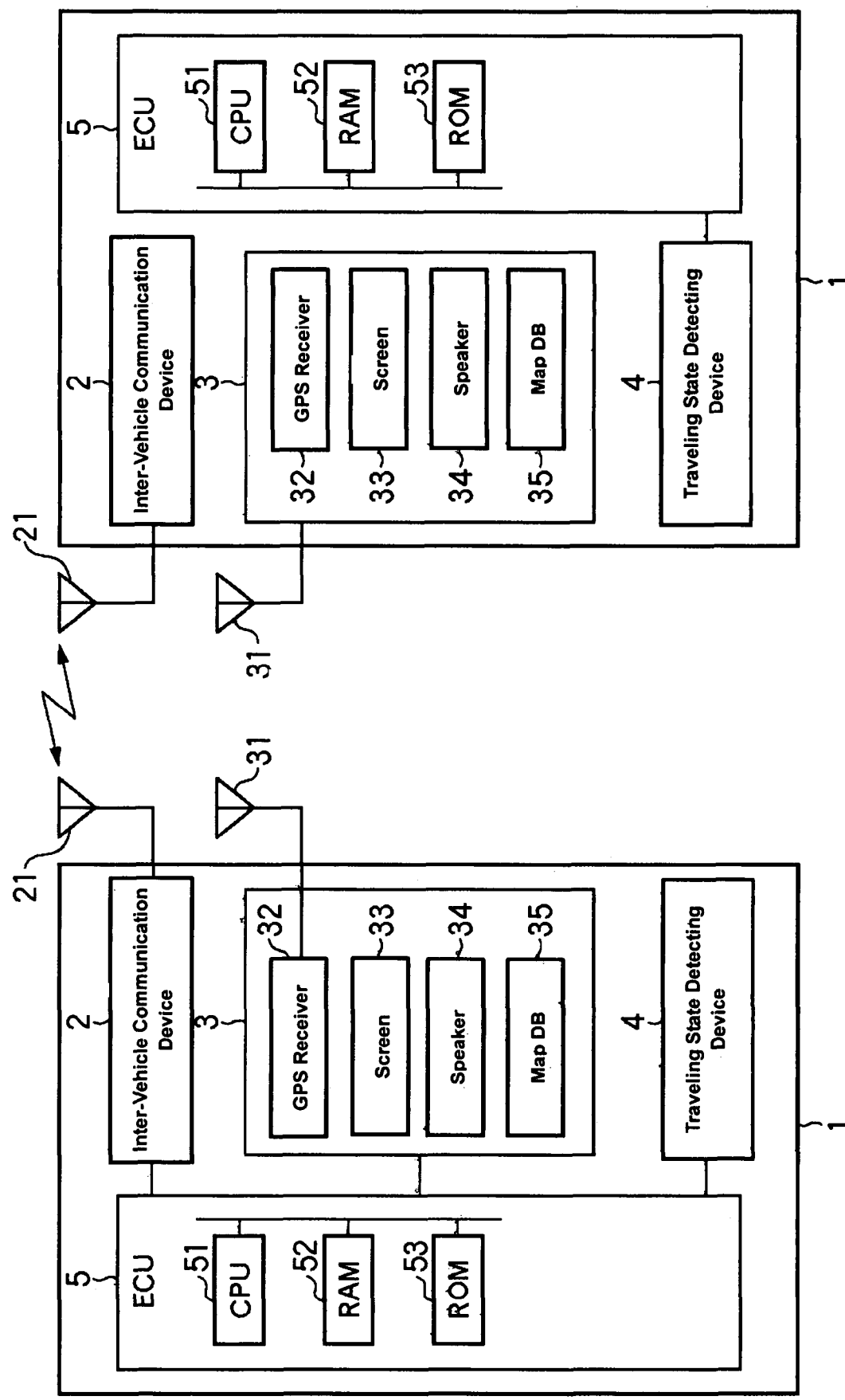
FIG. 1 is a block diagram showing a structure of a driving assist system according to a first embodiment of the present invention.

FIG. 1 is a block diagram showing a structure of a driving assist system according to a first embodiment of the present invention.

A driving assist system 1 that is installed on a vehicle in FIG. 1 comprises an inter-vehicle communication device 2 that transmits and receives various information between the own vehicle and another vehicle (one or more vehicles; hereinafter referred to as "another vehicle" regardless of the number of vehicles just for simplicity) equipped with the same system (which may be also refereed to as a partner vehicle(s) or a vehicle(s) traveling on an opposite traffic lane), a car navigation device 3, a traveling state detecting device 4 that outputs information regarding a traveling state of the own vehicle, and an ECU 5 to conduct a driving assist control in which a possible collision between the own vehicle and another vehicle that exists around the own vehicle is predicted based on the various information obtained from the above-described devices 2, 3 and 4, and information provision (warning) is conducted to a driver of the own vehicle based on prediction results in order to avoid the collision.

The inter-vehicle communication device 2 comprises a transmission antenna 21, and transmits information of the own vehicle and receives information of another vehicle that exists within a specified distance (hundreds of meters, for example) from the own vehicle. Herein, some communication system between road and vehicle, such as DSRC (Dedicated Short Range Communications) may be applied if the above-described distance is rather shorter (dozens of meters).

The car navigation device 3 comprises a GPS antenna 31 and a GPS receiver 32, and outputs a location information (latitude, longitude, direction, etc.) of the own vehicle, for example. The car navigation device 3 comprises a screen 33 to display images of map information and the like and a speaker 34 to provide a voice message or the like for a traveling-path guide and the like. The ECU 5 conducts the information provision warning) to the driver with images or voices from the screen 33 and speaker 34 with respect to an existence of another vehicle that is approaching the own vehicle or has a possibility of collision with the own vehicle.

Further, the car navigation device 3 comprises a map data base (hereinafter, referred to as a map DB) 35. The ECU 5 obtains from this map DB 35 the own vehicle's location coordinates after map matching, coordinates of an intersection (intersections) in front of the own vehicle, distance to intersections, existence of traffic signals at intersections, cross angle of branch roads at intersections (road connection angle), road information of branch roads (kinds of road, such as national state road or local road, road number, road width, the number of traffic lanes, etc.), traveling road information of the own vehicle (kinds of road, road number, road width, the number of traffic lanes, etc.). (Hereinafter, these obtained information is referred to as "navigation information") Herein, the location information of the GPS may be properly corrected so as to improve an accuracy by receiving correction data of FM multiplex broadcasting with the car navigation device 3 that is equipped with DGPS (differential GPS).

The traveling state detecting device 4 comprises a vehicle speed sensor to detect a vehicle speed of the own vehicle, an acceleration sensor to detect an acceleration of the own vehicle, a yaw rate sensor to detect a yaw rate of the own vehicle, various sensors of a self-navigation device that comprises a gyro meter to detect a traveling direction of the own vehicle and so on, and various switches such as ignition switch, hazard switch, brake switch, winker switch. The ECU 5 obtains the traveling state information of the own vehicle from these sensors and switches.

The ECU 5 is comprised of a computer including CPU 51, RAM 52 and ROM 53 basically. The ROM 53 stores a transmission program to exchange information between vehicles via the inter-vehicle transmission device 2, a program to determine a collision possibility with another vehicle by using another vehicle' information, navigation information, traveling state information and the like that are obtained via the inter-vehicle transmission device 2, and a program to display the own vehicle's location and another vehicle's location on the map and to output the driver some warning with images or voices in accordance with the possibility of collision.

The ECU 5 provides a peculiar identification (ID) information of the own vehicle (transmitting-side information), including a vehicle size (length, width, etc.) and kinds of vehicle (big car, passenger car, emergency car, etc.), and an ID information of another vehicle (receiving-side information) to another vehicle that exists within a specified distance from the own vehicle via the inter-vehicle transmission device 2 (hereinafter, referred to as "own vehicle's information"). Likewise, the ECU 5 receives information with respect to another vehicle (hereinafter, referred to as "another vehicle's information") transmitted from another vehicle.

In the present embodiment, a transmission system (broadcasting system) that can conduct transmissions to plural vehicles at the same time is used. However, a different type of transmission system that establishes a particular transmission connection at a transmission starting by identifying particular vehicles on a transmitting side and a receiving-side vehicle may be applied.

Also, in the present embodiment, a transmission interval of the inter-vehicle transmission is approximately 0.1 sec, and the information transmission is effective even while the ignition switch of the vehicle is turned off in order to recognize a parked vehicle.

Further, in a case where an infrastructure device (a beacon for transmission between road and vehicle, for example) is provided at or near intersections, the own vehicle may transmit the own vehicle's information to another vehicle around the own vehicle by using this infrastructure device.

The ECU 5 detects the intersection that the own vehicle and another vehicle may intersect based on the above-described another vehicle's information, navigation information and traveling state information, identifies another vehicle that has the possibility of collision by predicting a distance and an arriving time of another vehicle to the intersection, and conducts the information provision (warning) to the own vehicle with respect to the existence of another vehicle having the collision possibility before the intersection.

Although the information provision (warning) is conducted by using the screen 33 and speaker 34 of the navigation device 3 in the present embodiment, any other manners of information provision may be applied for example, an overhead screen or a buzzer for a warning sound may be used, or a seat vibrator to generate vibration at a seat in which the driver is seated may be used.

Further, at the own vehicle may be provided a CCD camera to take images of forward views of the traveling road, a laser radar to measure a distance to another vehicle in front of the own vehicle, a clearance sonar using supersonic waves, and so on. The ECU 5 may identify another vehicle having the collision possibility by checking traveling vehicles or parked vehicle in front of the own vehicle based on the information obtained from the above-described camera, radar and the like.

Figure 2:
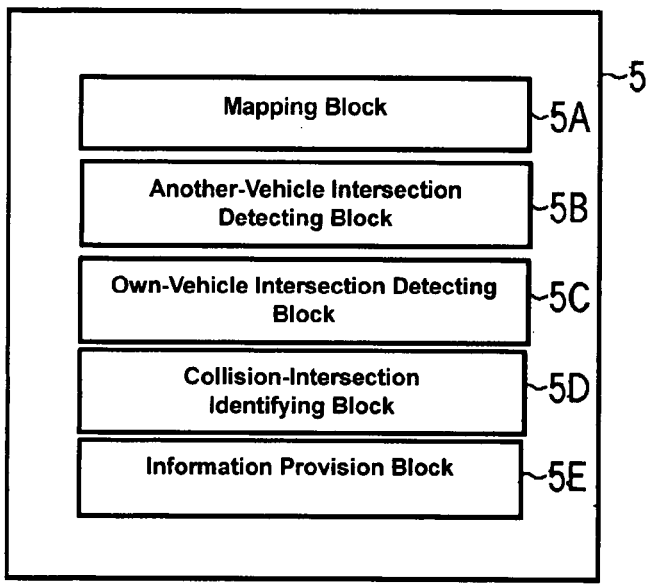
FIG. 2 is a functional block diagram of an ECU to materialize the driving assist system of the present embodiment.

FIG. 2 is a functional block diagram of the ECU to materialize the driving assist system of the present embodiment.

In FIG. 2, a reference character 5A denotes a mapping block to locate the own vehicle and another vehicle on the map DB. A reference character 5B denotes an another-vehicle intersection detecting block to detect intersections that are located on a traveling path of another vehicle. A reference character 5C denotes an own-vehicle intersection detecting block to detect intersections that are located in front of the own vehicle. A reference character 5D denotes a collision-intersection identifying block to identify the intersection that is identical to each other as the possible collision intersection by comparing the intersections detected by the above-described intersection detecting blocks. A reference character 5E denotes an information providing block to conduct the information provision based on calculations of an arriving time of another vehicle by using a distance to the possible collision intersection and the vehicle speed.

[Information Provision Processing]

Figure 3:
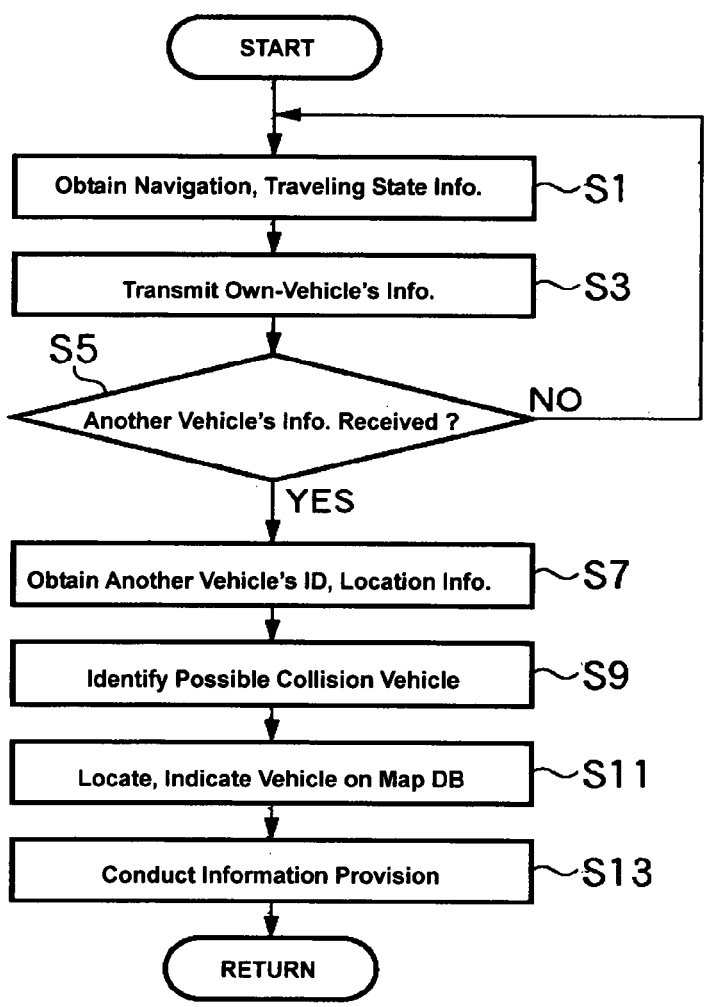
FIG. 3 is a flowchart showing information provision processing by the driving assist system of the present embodiment.

FIG. 3 is a flowchart showing information provision processing by the driving assist system of the present embodiment.

The ECU 5 obtains the own vehicle's information, such as the navigation information and the traveling state information, and transmits (S1, S3) in FIG. 3. Then, the ECU 5 obtains another vehicle's information including its ID, location, traveling direction when receiving from another vehicle (S5, S7).

Next, the ECU 5 identifies another vehicle having the collision possibility, which will be described below, locates it on the map DB 35, and indicates the own vehicle and another vehicle on the map image on the screen 33 (S9, S11). Herein, locating vehicles on the map (mapping) is applied by using a conventional map matching technology of the navigation device. This map matching technology is known, for example, as a method in which a vehicle traveling path is detected based on a traveling direction that may be detected by the gyro and the vehicle speed sensor of the navigation device, and by comparing this vehicle traveling path detected with the road information on the map, the current location of the traveling vehicle is determined.

Subsequently, the ECU 5 conducts the information provision with respect to the vehicle having the collision possibility (S13).

FIGS. 6A and 6B are samples of images of information provision displayed on the screen. In a case where another vehicle approaches the intersection in front of the own vehicle from the right, an information provision (warning) image shown in FIG. 6A is indicated and a massage of "another vehicle is approaching from the right" and its related alarm are provided. Meanwhile, in a case where another vehicle approaches the intersection in front of the own vehicle from the left, an information provision (warning) image shown in FIG. 6B is indicated and a massage of "another vehicle is approaching from the left" and its related alarm are provided.

[Indication of Vehicle Having Collision Possibility: Embodiment 1]

Figure 4:
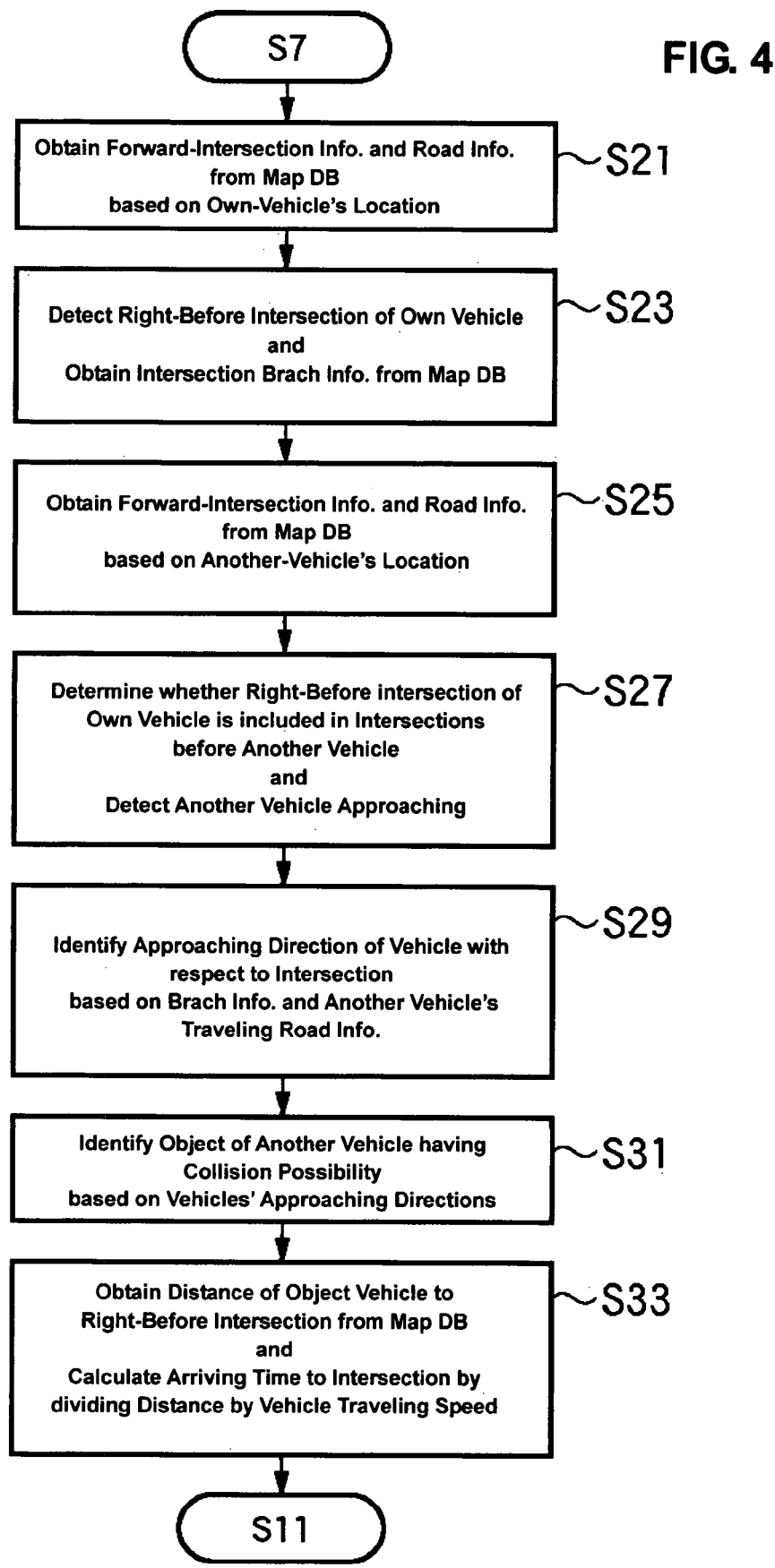
FIG. 4 is a flowchart showing an embodiment 1 of identification process of a vehicle having a collision possibility in step S9 of FIG. 3.

FIG. 4 is a flowchart showing an identification process of a vehicle having the collision possibility in step S9 of FIG. 3. FIG. 5 is an explanatory diagram showing the identification process of the vehicle having the collision possibility of FIG. 4.

In FIGS. 4 and 5, the ECU 5, as the own-vehicle intersection detecting block 5C, obtains the information of the intersection in front of the own vehicle (hereinafter, referred to as "forward-intersection information") and the traveling road information of the own vehicle from the map DB based on the own vehicle's location (S21). Herein, it obtains a location of an own vehicle A, intersections iii, vii, vi, and traveling road II that are shown in FIG. 5.

Then, the ECU 5 detects an intersection that is located right before the own vehicle (hereinafter, referred to as "right-before intersection") among the intersections in front of the own vehicle, and obtains an intersection branch information (S23). Herein, it obtains branch information (I: crossing road with a right angle from the left, II: own vehicle's road, III: crossing road with a right angle from the right, IV: facing from the front) that are shown in FIG. 5.

The ECU 5, as the another-vehicle intersection detecting block 5C, obtains the information of the intersection in front of another vehicle (hereinafter, referred to as "forward-intersection information") and the traveling road information of another vehicle from the map DB based on the another vehicle's location (S25). Herein, it obtains a vehicle B1 (intersections: i-v, traveling road: I), vehicle B2 (intersections: ii, i, traveling road: I), vehicle B3 (intersections: iv, v, traveling road: III), vehicle B4 (intersections: v, iv, iii, ii, i, traveling road: III), vehicle B5 (intersections: vi, vii, iii, viii, ix, traveling road: IV), vehicle B6 (intersections: vii, vi, traveling road: IV), vehicle B7 (intersections: i, traveling road: II), vehicle B8 (intersections: ix, viii, iv, vi, vi, vi, traveling road: II) that are shown in FIG. 5.

Next, the ECU 5, as the collision-intersection identifying block 5D, determines whether or not the right-before intersection of the own vehicle is included in the intersections that are located in front of another vehicle, and detects another vehicle approaching this intersection based on results of the determination (S27). Herein, it detects vehicles (B1, B4, B5, B8) in which the right-before intersection iii of the own vehicle is included in the intersections in front of another vehicle shown in FIG. 5.

Subsequently, the ECU 5 identifies an approaching direction (angle) of vehicles with respect to the intersection based on the branch information of the intersection right before the own vehicle and the another-vehicle traveling road information (S29). Herein, the approaching angles of the following respective vehicles are identified based on the branch information of the right-before intersection iii of the own vehicle and the traveling road information of the vehicle approaching the intersection.

Vehicle B1 (traveling road I: connecting from the west→crossing with the right angle from the left to the intersection iii)

Vehicle B4 (traveling road III: connecting from the east→crossing with the right angle from the right to the intersection iii)

Vehicle B5 (traveling road IV: connecting from the north→facing from the front to the intersection iii)

Vehicle B8 (traveling road II: connecting from the south→traveling on the same road as the own vehicle to the intersection iii)

Next, the ECU 5 identifies an object of another vehicle having the collision possibility based on the approaching directions to the intersection (S31). Herein, the vehicle B1 (approaching from the west), B4 (approaching from the east) may be identified as the object of another vehicle having the collision possibility in case of predicting the above-described sudden-meeting collision. The vehicle B5 (approaching from the north) may be identified as the object of another vehicle having the collision possibility in case of predicting the right-turn collision. And, the vehicle B8 (approaching from the south) may be identified as the object of another vehicle having the collision possibility in case of predicting the left-turn collision. Namely, the object of another vehicle, to which the predicted collision, information provision, and the like need to be provided, can be properly selected by identifying the approaching direction to the intersection, like an embodiment 3 that will be described below.

Next, the ECU 5 obtains the distance from the object of another to the right-before intersection from the map DB, and calculates its arriving time to the right-before intersection by dividing the above-described distance by its vehicle traveling speed (S33). Herein, it obtains respective distances of the identified object of another vehicle B1, B4, B5, B8 to the intersection iii from the map DB, and the arriving time of the respective vehicles are calculated by dividing the respective distances by respective vehicle traveling speeds.

Then, the object of another vehicle having the collision possibility is located on the map DB 35 in the step S11 of FIG. 3, and the information provision is conducted based on the arriving time of the object of another vehicle to the right-before intersection in the step S13.

Herein, in the above-described processes, the traveling path of another vehicle is predicted from navigation information of a navigation system of another vehicle. Thus, the intersection where the traveling path of navigated another vehicle and the traveling path of the own vehicle cross can be identified. Thereby, another vehicle that has the navigation information showing making a turn to the right or the left just before the possible collision intersection can be properly eliminated, so the accuracy of identifying another vehicle can be improved.

[Intersection Approaching Angle Calculation 1]

Hereinafter, a method 1 for calculating the intersection approaching angle of another vehicle at the intersection including the road with a curve will be described.

According to the conventional driving assist system, it may be necessary to predict from which direction another vehicle will approach to the intersection and to determine what type of collision (see FIG. 14) is predicted. Thus, the approaching direction may be identified by determining which road another vehicle travels on with reference of the road ID connecting to the intersection and the connection angle from the map DB. However, since the peculiar ID is not be given to each road on the present map DB, the approaching direction of another vehicle to the intersection may not obtained from the map DB.

In the conventional system, the intersection approaching angle may be obtained based on a direction angle θ2 of another vehicle B with respect to the direction angle θ1 of the own vehicle (see FIG. 7A). This method may have a concern that a wrong intersection approaching angle would be calculated due to difference between the vehicle direction angle and the intersection connection angle in a case where another vehicle travels on the road with a curve. For example, when some information provision related to a situation where the sudden-meeting collision is required, information provision for predicting vehicle's making a turn to a specified side that is opposite to the vehicle-traveling-lane side (vehicle's making the right turn in Japan, for example) would be provided. Thus, the driver might be made upset.

Hereinafter, a method for calculating the intersection approaching angle accurately even at the above-described situation will be described. In FIG. 7B, the direction angle of the own vehicle A is set to be θ1 the direction angle of another vehicle B is set to be θ2, and an inclined angle of a line connecting the intersection and another vehicle is set to be φ. Herein, if an equilateral triangle that has a bottom side comprised of a line connecting the intersection and another vehicle and a bottom angle formed between the line and the traveling direction of another vehicle is drawn, a cross angle X of the road to be obtained may be indicated by 2·φ−θ2±π (the sign of ± is depends on which is greater, θ2 or φ). Then, the intersection approaching angle of another vehicle with respect to the direction angle of the own vehicle may be obtained by calculating of the difference between θ1 and X.

Herein, since an area near the intersection (10 m or nearer) may not be influenced by the road shape, this method is not used but the present method in which the cross angle is determined by using values calculated at a further area is used. Thereby, the approaching angle to the intersection can be obtained accurately even in a case where another vehicle travels on the road with a curve. Further, any complex calculation may not be necessary, and so it can be obtained through a simple processing.

[Intersection Approaching Angle Calculation 2]

Hereinafter, a method 2 for calculating the intersection approaching angle of another vehicle at the intersection including the road with a curve will be described.

According to the conventional driving assist system, there is another method, but the method shown in FIG. 7A, in which the intersection approaching angle is obtained based on an inclined angle, of the line connecting the intersection and another vehicle B and a direction angle of the vehicle B (see FIG. 8A).

This method may have a concern that the prediction accuracy of the intersection approaching angle would deteriorate, in particular in a case where the road with a curve on which another vehicle travels is of some irregular shape, or where the road between the intersection and the curve has a rather long straight portion.

Hereinafter, a method that can provide an accurate calculation of the intersection approaching angle even at the above-described cases will be described. Namely, in FIG. 8B, plural nodes Ni on the traveling road of another vehicle B are obtained from the map DB based on the location of another vehicle B. Then, a link L1 that is right before the node N at the right-before intersection of the own vehicle is detected among these plural nodes Ni. And, an inclination X of a line that connects coordinates of the link L1 and coordinates of the node N of the right-before intersection is obtained. Thus, the intersection approaching angle of another vehicle B with respect to the own angle A by calculating the difference between the direction angle θ1 of the own vehicle A and the cross angle X of the road. Herein, the above-described nodes denote location information on the map DB that are placed at intervals of 100 m on the straight portion of the road and at intervals of 10-20 m, and the above-described link denotes connection information that connect adjacent nodes.

The approaching angle to the intersection can be accurately obtained by this method even in the case where another vehicle travels on the curve road with some irregular shape.

[Inaccuracy of Mapping Location and Others]

Figure 9A:
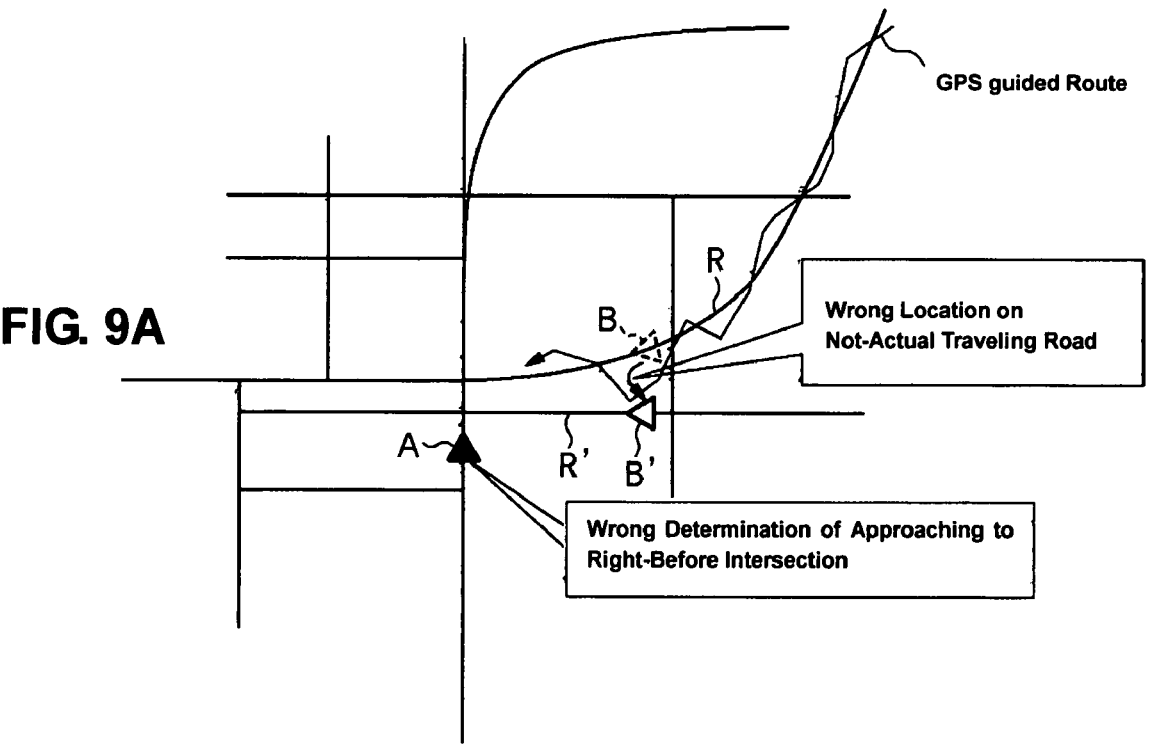
FIGS. 9A and 9B are explanatory diagrams of method for changing a manner of information provision due to inaccurate mapping.

There is a concern that another vehicle B would be wrongly located as another vehicle B' on the map DB at a road R' that is different from the road R on which the vehicle B actually travels when the vehicle travels in an area where so many narrow roads gather and the detection accuracy of the GPS of another vehicle B is rather low due to existence of high buildings nearby (arriving time of the GPS signals may be delayed because of reflection on buildings), as shown in FIG. 9A. In this case, it is determined wrongly that another vehicle B approaches the intersection right before the own vehicle A, which could cause the delayed or wrong information provision.

Also, in a case where the map DB is not updated, there would be a risk of some collision with any other vehicles traveling on new roads that may not exist on an old map DB.

Further, in a case where any other vehicles can not receive the GPS signal, the location of those would not be identified, so there would be concern of the collision as well.

Meantime, in the current map DB, all of the roads do not have their ID, but the kinds of road (such as the national state road, local road, or others) and the road number (such as Route No. 1, there may exist roads without number) are just assigned. Accordingly, there are some cases where the another vehicle's approaching direction to the intersection could not obtained from the map DB.

Figure 9B:
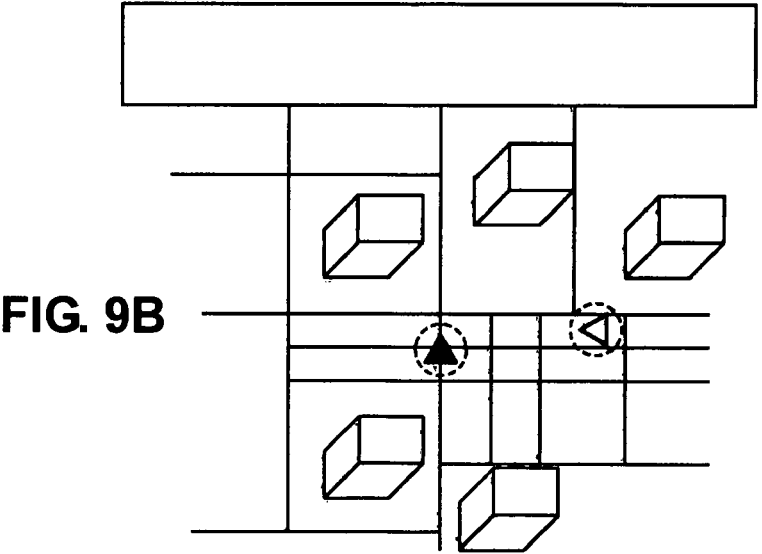

Accordingly, in the case where the area having the inaccurate mapping or the collision possibility cannot be detected properly as described above, the manner of information provision is changed as shown in FIG. 9B. Herein, this changed manner, for example, includes some ways in which the vehicle is indicated intentionally to travel on different place than roads, some warning message for encouraging an "eye check (confirmation)" is generated, or warning with an alarm or vibrating pedal of accelerator is provided.

[Indication of Vehicle Having Collision Possibility: Embodiment 2]

Figure 10:
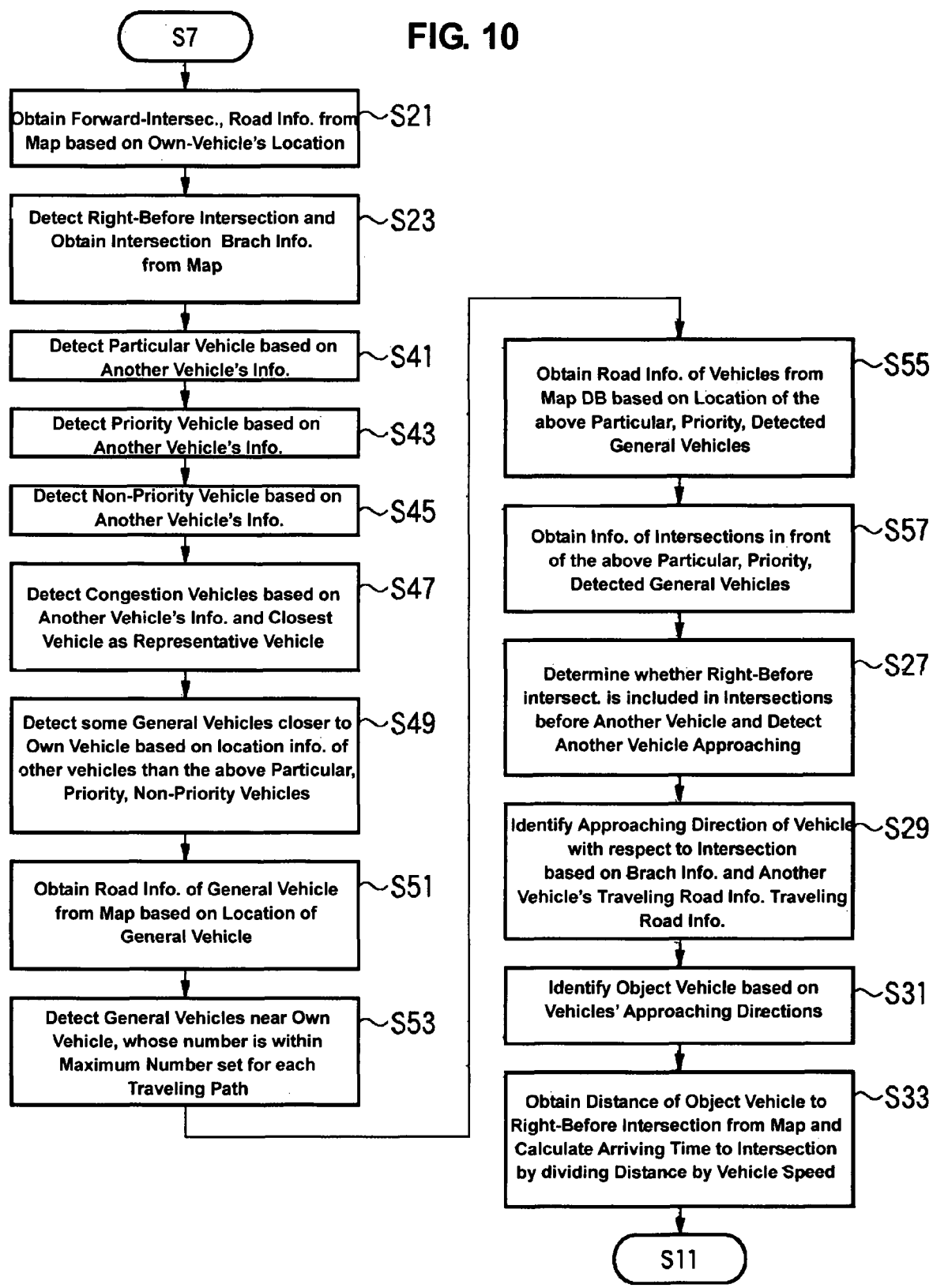
FIG. 10 is a flowchart showing an embodiment 2 of identification process of the vehicle having the collision possibility in the step S9 of FIG. 3.
Figure 11:
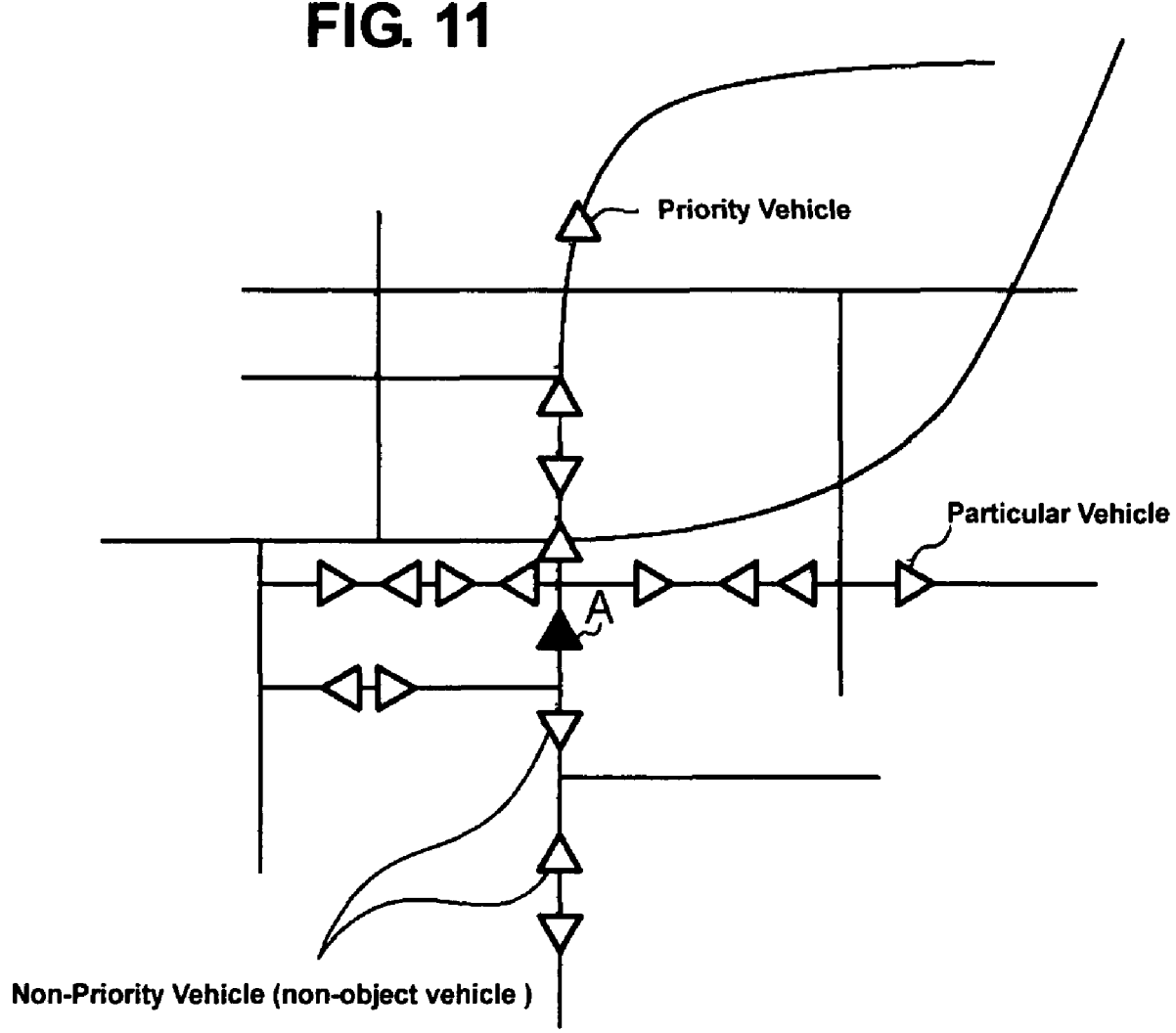
FIG. 11 is an explanatory diagram showing the identification process of the vehicle having the collision possibility of FIG. 10.

FIG. 10 is a flowchart showing an embodiment 2 of identification process of the vehicle having the collision possibility in the step S9 of FIG. 3. FIG. 11 is an explanatory diagram showing the identification process of the vehicle having the collision possibility of FIG. 10.

The above-described embodiment 1 may require a considerably high capacity of calculation processing (more than a 200-maximum-vehicle availability) because of the prediction of traveling paths for all vehicles located on the map DB. Accordingly, the processing capacity may be limited to some limited number of vehicles depending on the CPU processing capacity used in the system. If the number of vehicles actually traveling exceeds the limited number, the vehicles to be located need to be selected (limited).

Thus, according to the present embodiment 2, when the object of vehicles having the collision possibility described referring to FIG. 4 is identified, the vehicles to be located are limited to only some vehicles that exist within a specified distance from the own vehicle, and/or limited in its maximum number to be located for each traveling path crossing the right-before intersection of the own vehicle.

The same processing in FIG. 10 as those in FIG. 4 have the same reference characters, whose descriptions will be omitted.

The ECU 5 detects the right-before intersection among the intersections in front of the own vehicle, and obtains the intersection branch information from the map DB (S23). Then, it detects some particular vehicle based on the another vehicle's information (S41). Herein, the particular vehicle is a vehicle traveling fast, a vehicle with a hazard turned on, an emergency car, or the like.

Next, the ECU 5 detects a priority vehicle based on the another vehicle's information (S43). Herein, the priority vehicle is the one that exists in front of the own vehicle and stops, slows down, or travels at a speed that exceeds a specified relative speed with respect to the own vehicle.

Subsequently, the ECU 5 detects a non-priority vehicle based on the another vehicie's information (S45). Herein, the non-priority vehicle is the one that exists behind the own vehicle and travels at a lower speed than the own vehicle.

Next, the ECU 5 detects congestion vehicles based on the another vehicle's information and further detects the closest vehicle to the own vehicle among these congestion vehicles as a representative vehicle (S47). Herein, the congestion vehicles are the ones that travel on a congested road when the other plural vehicles travel at a specified speed or lower within a specified distance from the own vehicle. These congestion vehicle are categorized as a group of vehicles.

Then, the ECU 5 detects some numbers of general vehicles that are closer to the own vehicle based on the location information of general vehicles that are other than the above-described particular vehicle, priority-vehicle and non-priority vehicle (S49). Herein, the representative vehicle of the congestion vehicles is counted as one vehicle.

Next, the ECU 5 obtains the traveling road information with respect to the general vehicle from the map DB based on the location information of the general vehicle that are detected in the step S49 (S51).

Subsequently, the ECU 5 detects the general vehicles near the own vehicle, whose number is within the maximum number set for each traveling path (S53).

Then, the ECU 5 obtains the traveling road information of respective vehicles from the map DB based on the location information of the above-described particular vehicle, priority vehicle, and detected general vehicles (S55).

Next, the ECU 5 obtains information of respective intersections that are located in front of the above-described particular vehicle, priority vehicle, and detected general vehicles (S57).

After this, the processing after the step S27 of FIG. 4 will be executed.

Herein, either one of the above-described steps S49 and S53 may be executed.

According to the above-described embodiment 2, the burden of calculation processing in the case where plural vehicles are located on the map data of the own vehicle may be reduced. Also, the possibility of collision can be determined promptly by picking up the vehicles having higher possibility of collision. Further, by excluding the vehicles that are located behind the own vehicle and travel slower than the own vehicle, an unnecessary calculation processing for these that may have less possibility of collision can be avoided.

[Indication of Vehicle Having Collision Possibility: Embodiment 3]

Figure 12:
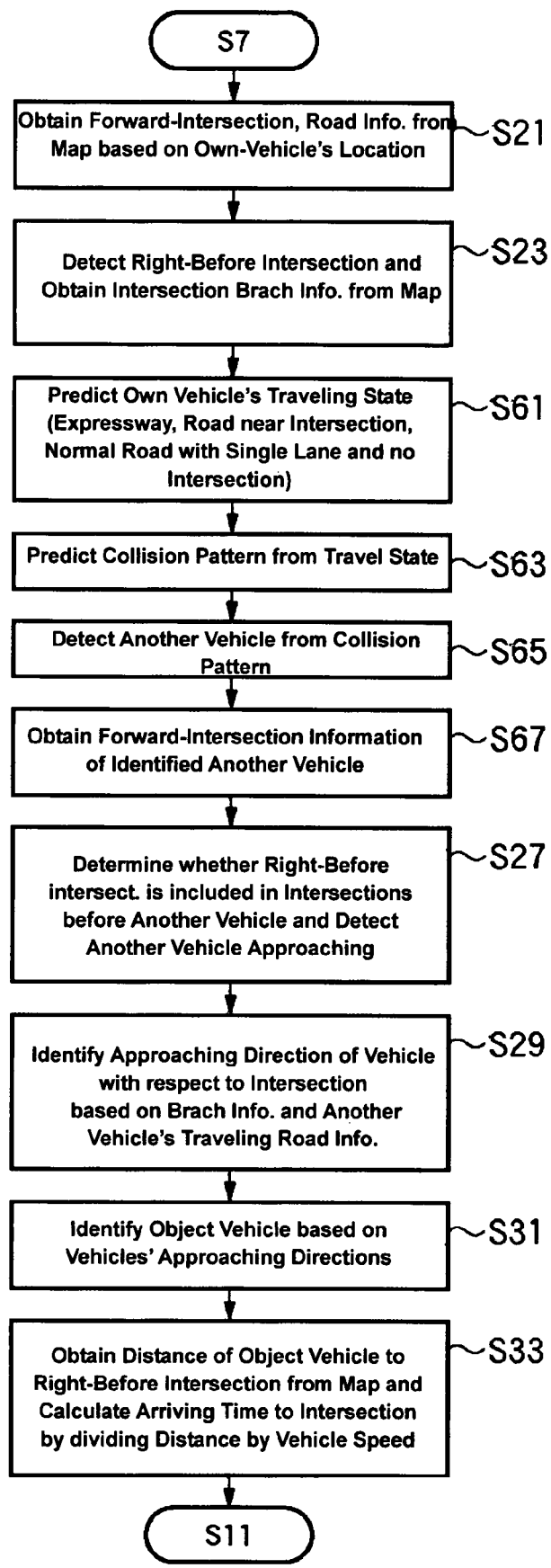
FIG. 12 is a flowchart showing an embodiment 3 of identification process of the vehicle having the collision possibility in the step S9 of FIG. 3.

FIG. 12 is a flowchart showing an embodiment 3 of identification process of the vehicle having the collision possibility in the step S9 of FIG. 3. FIG. 13 is an explanatory diagram showing the identification process of the vehicle having the collision possibility of FIG. 12. FIG. 14 is a chart showing an exemplified collision pattern that is predicted when the vehicle having the collision possibility is identified.

According to the embodiment 3, a collision pattern between the own vehicle and another vehicle is predicted based on the traveling state of the own vehicle at the identification of another vehicle having the collision possibility, which was described above referring to FIG. 4.

The same processing in FIG. 12 as those in FIG. 4 have the same reference characters, whose descriptions will be omitted.

The ECU 5 detects the right-before intersection among the intersections in front of the own vehicle, and obtains the intersection branch information from the map DB (S23). Then, it predicts the traveling state of the own vehicle (S61). Herein, it is predicted based on the own vehicle's information whether or not the traveling road of the own vehicle is an expressway, a road near intersection, a normal road that has a single traffic-lane and no intersection, or the like.

Next, the ECU 5 predicts the pattern of collision according to the traveling state (S63). The collision pattern, whose examples are shown as six patters in a chart of FIG. 14. For example, the rear-end collision or the collision at the traffic-lane change are predicted when the own vehicle travels on the expressway. The sudden-meeting collision or a making-turn collision are predicted when the own vehicle travels around the intersection. A head-on collision is predicted when the own vehicle travels on the normal road that has the single traffic lane and no intersection.

Then, the ECU 5 detects another vehicle by identifying according to the collision pattern predicted in the above-described step S63 (S65)

In the steps 63, 65, when the own vehicle travels on the expressway, the rear-end collision or the collision at the traffic-lane change are predicted as the collision pattern, and another vehicle that exits in front of or behind the own vehicle is detected and located as the object of vehicle of the collision pattern.

Also, when the own vehicle travels around the possible collision intersection, the collision of the own vehicle making a turn, the sudden-meeting collision of making a straight, or the head-on collision are predicted as the collision pattern, and another vehicle that exists within a specified distance from the own vehicle is detected and located as the object of vehicle of the collision pattern.

Further, when the own vehicle travels on a normal road that has two or more traffic-lanes on one side and no intersection, the rear-end collision or the collision at the traffic-lane change are predicted as the collision pattern, and another vehicle that exits in front of or behind the own vehicle is detected and located as the object of vehicle of the collision pattern.

And, when the own vehicle travels on the normal road that has one traffic-lane on one side and no intersection, the rear-end collision or the head-on collision are predicted as the collision pattern, and another vehicle that exits in front of the own vehicle is detected and located as the object of vehicle of the collision pattern.

Next, the ECU 5 obtains the forward-intersection information of another vehicle identified in the above-described step S65 (S67).

After this, the processing after the step S27 of FIG. 4 will be executed.

Herein, in a case where a motorcycle is equipped with another type of inter-vehicle transmission system that has simpler device than that shown in FIG. 1, the motorcycle may be included in another vehicle that has been described above, so a kind of collision in which the motorcycle gets involved may be predicted as one of pattern of the left-turn collision.

Thus, according to the embodiment 3, not only another vehicle having the collision possibility is identified according to the traveling state of the own vehicle, but the collision pattern can be predicted. As a result, the prediction accuracy of the collision possibility can be improved.

[Change of Information Provision Timing]

In the driving assist system described above, the timing of the information provision may be changeable. Hereinafter, a modified embodiment as a second embodiment of the present invention will be described.

Figure 15:
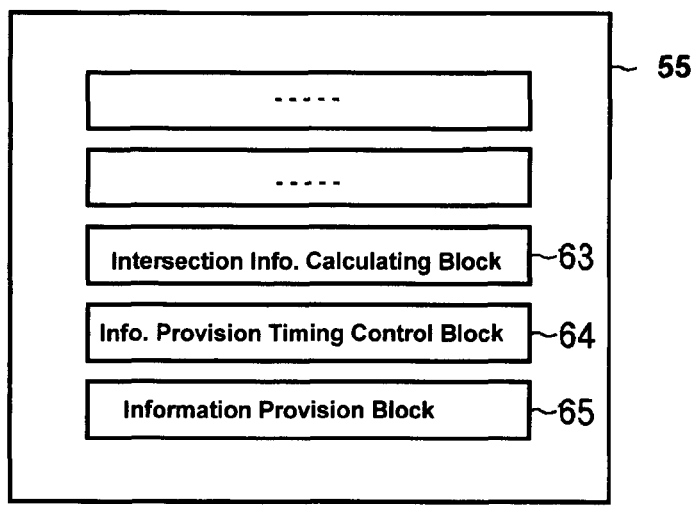
FIG. 15 is a functional block diagram of a modified ECU of a second embodiment of the driving assist system.

An ECU 55 of the modified embodiment further comprises, as shown in FIG. 15, an intersection information calculating block 63 as an intersection information calculating device to calculate road information of the possible collision intersection, and an information provision timing controlling block 64 as an information provision timing controlling device to change timing of the information provision with respect to another vehicle. More specifically, the intersection information calculating block 63 calculates a road connection angle between the traveling path of the own vehicle and the traveling path of another vehicle at the possible collision intersection, and the information provision timing controlling block 64 changes the timing of the information provision based on the road connection angle calculated. In FIG. 15, a reference numeral 65 denotes an information provision block that is substantially the same as the block 5E shown in FIG. 2.

Figure 16:
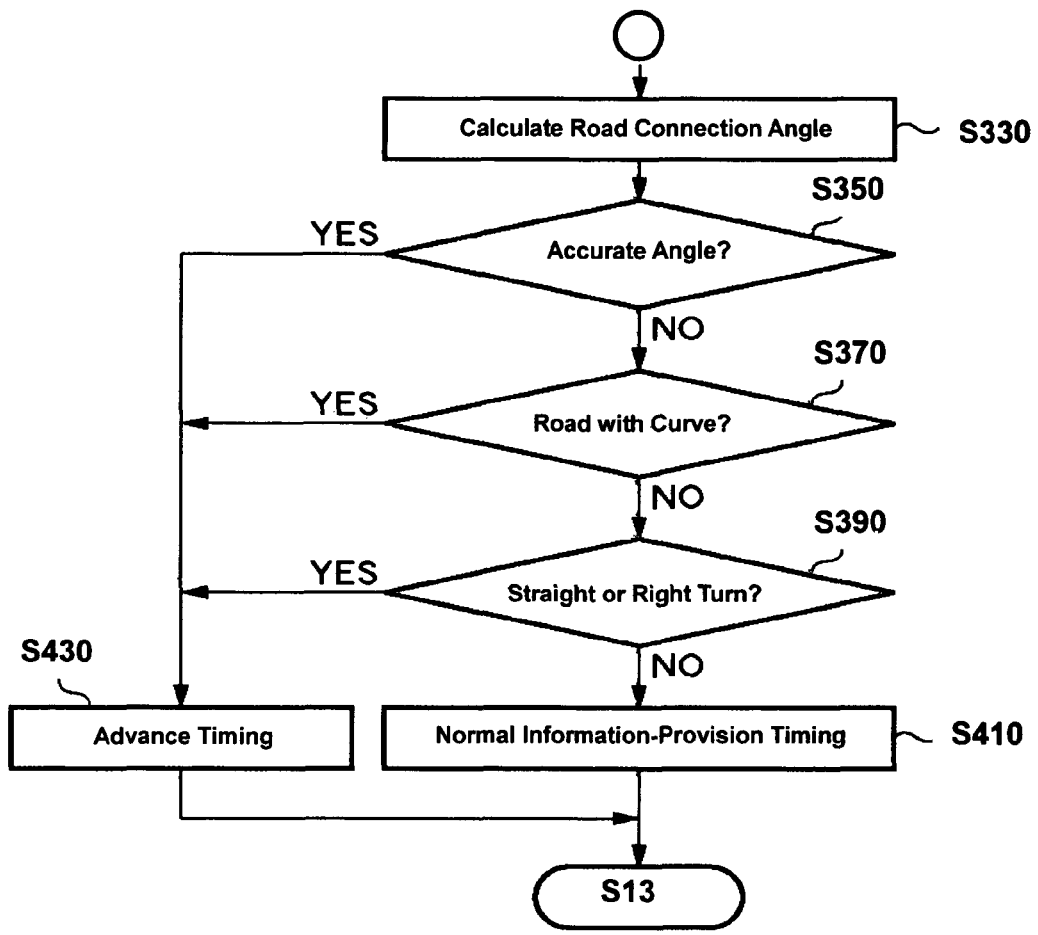
FIG. 16 is a flowchart showing steps of setting the timing of the information provision.

FIG. 16 is a flowchart showing steps of setting the timing of the information provision.

The intersection information calculating block 63 of the ECU-55 calculates a road connection angle α between the traveling path of the own vehicle and the traveling path of another vehicle at an intersection IS that the own vehicle approaches (S330).

Then, when the road connection angle α is an acute angle (i.e., α<90 degrees), the ECU 55 advances the timing of the information provision timing from the normal timing with the information provision timing controlling block 64 (S350, S430). Herein, the timing distance for information provision and/or the arriving time are changed to a longer new timing distance D and/or a longer new arriving time T from respective normal ones D0, T0.

When another vehicle approaching the intersection in front of the own vehicle travels on the road with a curve, the ECU 55 advances the information provision timing from the normal timing (S370, S430). Herein, the timing is changed in the step S430 in the same manner.

When the own vehicle makes a straight drive or makes the right turn at the intersection, the ECU 55 advances the information provision timing from the normal timing (S390, S430). Herein, the timing is changed in the step S430 in the same manner. This making the straight drive or making the right turn may be determined in such a manner that straight proceeding is detected when any turn signal switch and a brake switch are off, while making the right turn is detected when a right-turn signal switch and the brake switch are turned on in front of the intersection. In the case of the making the straight drive or making the right turn (in the case of the vehicle traveling in Japan), the own vehicle generally stay in the intersection for a relatively long period compared to the case of making the left turn, which may increase the possibility of collision with another vehicle. Thus, the information provision timing is advanced properly. As a result, the driver of the own vehicle can recognize another vehicle approaching the intersection promptly, so that the sudden-meeting collision or the right-turn collision can be prevented properly.

Herein, in the case where the own vehicle makes the straight drive or makes the right turn, by advancing the timing of information provision with respect to another vehicle approaching from the left of the own vehicle, the sudden-meeting collision or the right-turn collision with this vehicle can be prevented properly.

The ECU 55 sets the normal information provision timing of the timing distance D0 and the arriving time T0 when the road connection angle α is not the acute angle (S350), another vehicle does not travel on the road with a curve (S370), or the own vehicle does not make the straight drive or make the right turn (S390).

[Calculation Method of Road Connection Angle α (S330)]

[Case of Road with No Curve]

In the case where the branch road that connects to the intersection in front of the own vehicle is not the road with a curve as shown in FIG. 17, the cross angle of the traveling path of another vehicle with respect to this intersection is obtained from the map DB 35, and the location, traveling speed and traveling direction of another vehicle are obtained from the another-vehicle information. Thereby, the road connection angle α is obtained.

[Case of Road with Curve]

It may not be determined only by the cross angle of the branch road to the intersection that is obtained from the map DB 35 whether the branch road is the road with a curve or not. There is also another problem of a wrong calculation in the case of the raveling road with a curve. Namely, since the traveling direction θb of another vehicle is different from the road connection angle α of the traveling path Rb of another vehicle to the intersection IS in the case of the raveling road with a curve, the approaching angle to the intersection IS would not be calculated properly. In this case, there is a concern that the information provision (warning) would be conducted despite a little possibility of collision at the intersection IS, so that the driver would be made get upset inappropriately.

According to the present embodiment, however, the intersection approaching angle is calculated based on the traveling direction θa of the own vehicle and the location and traveling direction θb of another vehicle, which will be described below, even in the case where the traveling path Rb of another vehicle B is the one with a curve.

In FIG. 18A, the vehicle's traveling direction θ is set to be 0 degree at the right north, and its magnitude increases along the clockwise direction. The direction angle of the own vehicle A is set to be θa, the direction angle of another vehicle B is set to be θb and the inclined angle of a line L connecting the intersection IS and another vehicle B is set to be φ. Herein, if the equilateral triangle that has a bottom side comprised of the line L connecting the intersection IS and another vehicle B and a bottom angle formed between the line L and the traveling direction of another vehicle B is drawn, the cross angle α of the traveling path Rb of another vehicle B may be indicated by $2\cdot\phi - \theta b \pm \pi$ (the sign of ± is depends on which is greater, θb or φ.

Then, the intersection approaching angle α−θa of the traveling path Rb of another vehicle B with respect to the direction angle θa of the own vehicle A can be obtained by calculating of the difference between the direction angle θa of the own vehicle A and the cross angle α of the traveling path Rb of another vehicle B.

Herein, since an area near the intersection (10 m or nearer) may not be influenced by the above-described road with a curve, the above-described calculation is not conducted at this near area, but this calculation is conducted while the vehicle travels 10 m away from the intersection.

According to the above-described calculation of the intersection approaching angle, the intersection approaching angle α−θa can be calculated accurately even in the case where another vehicle travels on the road with a curve in front of the intersection. Further, any complex calculation may not be necessary, and so it can be obtained through a simple processing.

[Other Calculation Method of Road with Curve]

Next, a calculation method of the intersection approaching angle using the map DB will be described.

Figure 19A:
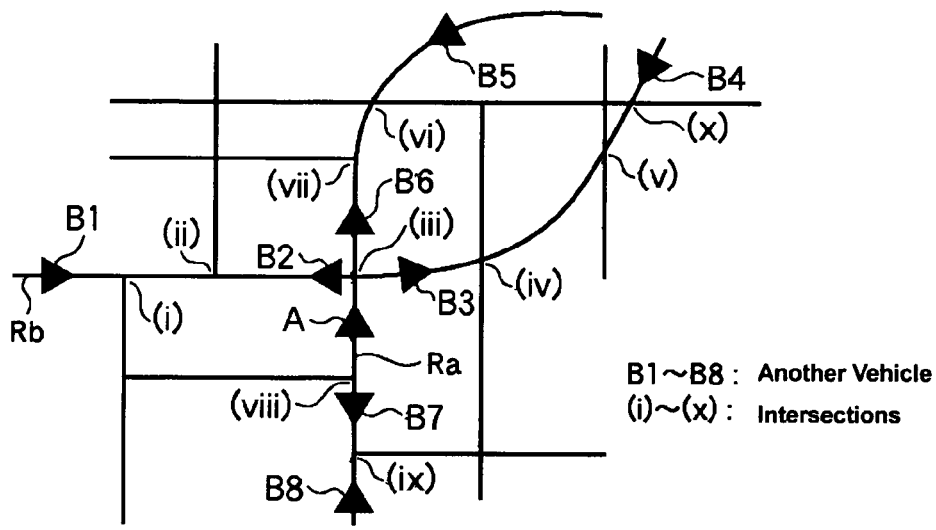
FIGS. 19A, 19B, 19C and 19D are explanatory diagrams of the calculation method of the cross angle at the intersection (road connection angle) in the step S330 of FIG. 16.
Figure 19B:
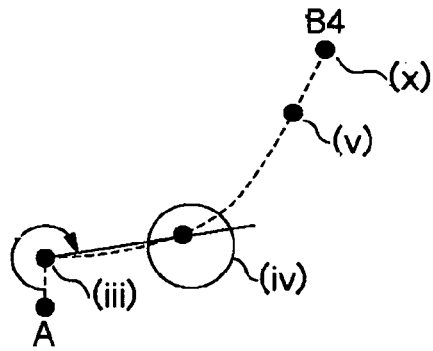

In FIG. 19A, since vehicles B1, B4 and B5, B8 travel on roads with a curve, respective approaching angles to the intersection IS can not be determined based on their direction angles. In this case, the cross angle of the traveling path of another vehicle B is calculated by using the location of the own vehicle, approaching intersection iii) and intersection coordinates (iv) of another vehicle B. For example, the cross angel for another vehicle B4 is calculated from an angle: A, (iii), (iv) as shown in FIG. 19A. Thereby, the calculation processing of the cross angle can be simplified.

Figure 19C:
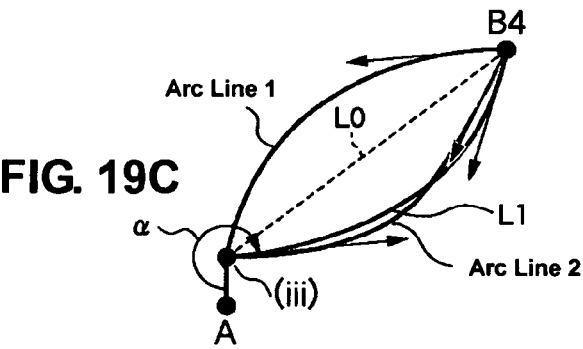

Further, as shown in FIG. 19C, a straight distance L0 between the intersection (iii) in front of the own vehicle A and another vehicle B is compared with a distance L1 along the road (road length). In a case where a difference of these distances exceeds a specified value, an arc line connecting these two points is drawn, and then a curvature of this arc line is determined so that the length of this arc line is equivalent to the road length. Thereby, there may be two patterns of arc lines 1 and 2 as shown. Herein, tangential lines of the arc lines at the location of another vehicle B4 are drawn, and the arc line 2, whose tangential line has a gradient that is closer to the traveling direction of another vehicle than the other arc line 1, is selected as an approximate traveling road of another vehicle.

Specifically, the arc line 2 having the tangential line's direction that is substantially identical to the traveling direction of another vehicle B4 will be the approximate traveling road of another vehicle B4. And, the angle between the tangential line of the arc line 2 at the intersection (iii) and the line connecting the own vehicle's location and the intersection (iii) will be the cross angle with respect to the intersection.

Figure 19D:
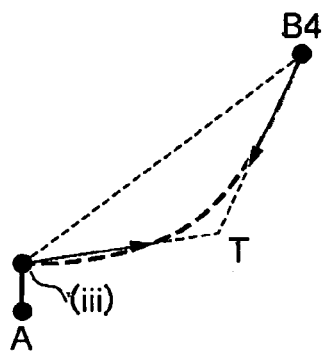

By further simplification, that will become similar to the contents described referring to FIG. 18A. Namely, as shown in FIG. 19D, if the equilateral triangle that has a bottom side comprised of the line connecting the intersection (iii) and another vehicle B4, an angle: (iii), B4, T is equal to an angle: T, (iii), B4. Accordingly, the approaching angle α to the intersection can be obtained by obtaining an angle: A, (iii), B4 and the angle: (iii), B4, T. Herein, the angle: (iii), B4, T will be obtained from a vector of the travel direction of another vehicle B4 and the gradient of the line L. Herein, the angle: A, (iii), B4 is obtained from respective coordinates of the points A, (iii) and B4.

According to the above-described embodiment, another vehicle driving in even an unclear (blind) intersection where the road connection angle is accurate can be identified promptly, so safety can be improved.

The present invention should not be limited to the above described embodiments, and any other modifications and improvements may be applied within the scope of a sprit of the present invention.

What is claimed is:

1. A driving assist system for a vehicle, comprising
a map data memory device to memorize map data;
an inter-vehicle communication device to transmit and receive information between an own vehicle and another vehicle;
a mapping device to locate another vehicle on the map data that the own vehicle has in said map memory device, location of another vehicle being identified based on information with respect to another vehicle that is obtained by said inter-vehicle communication device;
an another-vehicle intersection detecting device to detect an intersection that is located on a traveling path of another vehicle, the traveling path of another vehicle being predicted based on the information with respect to another vehicle that is obtained by said inter-vehicle communication device;
an own-vehicle intersection detecting device to detect an intersection that is located in front of the own vehicle;
a collision-intersection identifying device to identify an intersection that is identical to each other as a possible collision intersection by comparing the intersections detected by said another-vehicle intersection detecting device and said own-vehicle intersection detecting device;
an information providing device to conduct an information provision based on calculation of an arriving time of another vehicle to reach the possible collision intersection identified by said collision-intersection identifying device; and
a collision pattern predicting device to predict a collision pattern between the own vehicle and another vehicle at the possible collision intersection, and said mapping device is configured such that another vehicle located thereby is limited to the one that has the collision pattern predicted by said collision pattern predicting device.

2. The driving assist system for a vehicle of claim 1, wherein said information providing device conducts a warning of an existence of another vehicle that is likely to collide with the own vehicle.

3. The driving assist system for a vehicle of claim 1, wherein said information providing device is configured to change a manner of the information provision in a traveling-road situation where locating another vehicle on the map data of said mapping device is inaccurate.

4. The driving assist system for a vehicle of claim 1, wherein said collision-intersection identifying device is configured to calculate a cross angle of said traveling path of another vehicle with respect to said possible collision intersection by using an equilateral triangle in a case where the traveling path of another vehicle is a road with a curve.

5. The driving assist system for a vehicle of claim 1, wherein said collision-intersection identifying device is configured to calculate a cross angle of said traveling path of another vehicle with respect to said possible collision intersection by using an intersection node among intersection nodes of the traveling path of another vehicle that is right before said possible collision intersection in a case where the traveling path of another vehicle is a road with a curve.

6. The driving assist system for a vehicle of claim 1, wherein said mapping device is configured such that another vehicle located thereby is limited to the one that exists within a specified distance from the own vehicle.

7. The driving assist system for a vehicle of claim 1, wherein said mapping device is configured such that another vehicle located thereby is limited in a maximum number thereof to be located for each traveling path.

8. The driving assist system for a vehicle of claim 1, wherein said collision pattern predicting device is configured to predict a rear-end collision or a collision at a traffic-lane change as the collision pattern when the own vehicle travels on an expressway, and said mapping device is configured such that another vehicle located thereby is the one that exits in front of or behind the own vehicle.

9. The driving assist system for a vehicle of claim 1, wherein said collision pattern predicting device is configured to predict a collision of the own vehicle making a turn or making a straight drive as the collision pattern when the own vehicle travels around the possible collision intersection, and said mapping device is configured such that another vehicle located thereby is the one that exists within a specified distance from the own vehicle.

10. The driving assist system for a vehicle of claim 1, wherein said collision pattern predicting device is configured to predict a rear-end collision or a collision at a traffic-lane change as the collision pattern when the own vehicle travels on a normal road that has two or more traffic-lanes on one side and no intersection, and said mapping device is configured such that another vehicle located thereby is the one that exits in front of or behind the own vehicle.

11. The driving assist system for a vehicle of claim 1, wherein said collision pattern predicting device is configured to predict a rear-end collision or a head-on collision as the collision pattern when the own vehicle travels on a normal road that has one traffic-lane on one side and no intersection, and said mapping device is configured such that another vehicle located thereby is the one that exits in front of the own vehicle.

12. The driving assist system for a vehicle of claim 1, wherein said mapping device is configured such that other plural vehicles located thereby are categorized as a group of vehicles that travel on a congested road when the other plural vehicles travel at a specified speed or lower within a specified distance from the own vehicle.

13. The driving assist system for a vehicle of claim 1, wherein said mapping device is configured such that another vehicle located thereby is the one that is picked up with priority as a vehicle having a specified feature based on the information with respect to another vehicle that is obtained by said inter-vehicle communication device.

14. The driving assist system for a vehicle of claim 1, wherein said mapping device is configured such that another vehicle located thereby is the one that exists in front of the own vehicle and stops, slows down, or travels at a speed that exceeds a specified relative speed with respect to the own vehicle.

15. The driving assist system for a vehicle of claim 1, wherein said mapping device is configured such that another vehicle located thereby is excluded from the one that exists behind the own vehicle and travels slower than the own vehicle.

16. A driving assist system for a vehicle, comprising:
a map data memory device to memorize map data;
an inter-vehicle communication device to transmit and receive information between an own vehicle and another vehicle;
a mapping device to locate another vehicle on the map data that the own vehicle has in said map memory device, location of another vehicle being identified based on information with respect to another vehicle that is obtained by said inter-vehicle communication device;
an another-vehicle intersection detecting device to detect an intersection that is located on a traveling path of another vehicle, the traveling path of another vehicle being predicted based on the information with respect to another vehicle that is obtained by said inter-vehicle communication device;
an own-vehicle intersection detecting device to detect an intersection that is located in front of the own vehicle;
a collision-intersection identifying device to identify an intersection that is identical to each other as a possible collision intersection by comparing the intersections detected by said another-vehicle intersection detecting device and said own-vehicle intersection detecting device;
an information providing device to conduct an information provision based on calculation of an aniving time of another vehicle to reach the possible collision intersection identified by said collision-intersection identifying device; and
an intersection information calculating device to calculate road information of said possible collision intersection, and an information provision timing controlling device to change timing of the information provision with respect to another vehicle by said information providing device based on the road information calculated by said intersection information calculating device.

17. The driving assist system for a vehicle of claim 16, wherein said road information is a road connection angle between a traveling path of the own vehicle and the traveling path of another vehicle at the possible collision intersection, and said information provision timing controlling device is configured such that the timing of the information provision by said information providing device is advanced in a case where said road connection angle is an accurate angle.

18. The driving assist system for a vehicle of claim 17, wherein said road connection angle is obtained from information of a traveling speed and a traveling direction of the own vehicle that is provided by a navigation system.

19. The driving assist system for a vehicle of claim 17, wherein said road connection angle is obtained from respective locations of the own vehicle, another vehicle, and the possible collision intersection.

20. The driving assist system for a vehicle of claim 17, wherein said information provision timing controlling device is configured such that the timing of the information provision by said information providing device is advanced in a case where the traveling path of another vehicle leading to said possible collision intersection has a curve, which is determined based on a location of the own vehicle, a traveling direction of the own vehicle, a location of the possible collision intersection, and a traveling direction of another vehicle.

21. The driving assist system for a vehicle of claim 16, wherein said information provision timing controlling device is configured such that the timing of the information provision by said information providing device is advanced in a case where the own vehicle makes a straight drive or makes a turn to a specified side that is opposite to a vehicle-traveling-lane side at the possible collision intersection.

22. The driving assist system for a vehicle of claim 21, wherein said timing advance of the information provision by said information providing device in the case where the own vehicle makes the straight drive or makes the turn is conducted for the information provision with respect to another vehicle that approaches from a vehicle-traveling-lane side of the own vehicle.

23. The driving assist system for a vehicle of claim 16, wherein said traveling path of another vehicle is configured to be predicted from navigation information of a navigation system that is on another vehicle.

* * * * *